(12) United States Patent
Gucyski

(10) Patent No.: US 6,366,474 B1
(45) Date of Patent: Apr. 2, 2002

(54) SWITCHING POWER SUPPLIES INCORPORATING POWER FACTOR CORRECTION AND/OR SWITCHING AT RESONANT TRANSITION

(76) Inventor: Jeff Gucyski, P.O. Box 11633, Costa Mesa, CA (US) 92627

( * ) Notice: Subject to any disclaimer, the term of this patent is extended or adjusted under 35 U.S.C. 154(b) by 0 days.

(21) Appl. No.: 09/676,792

(22) Filed: Sep. 29, 2000

(51) Int. Cl.[7] .................. H02M 3/335; H02M 5/42; G05F 1/40
(52) U.S. Cl. .................. 363/20; 363/16; 363/89; 323/266
(58) Field of Search .................. 363/89, 20, 16; 323/266

(56) References Cited

U.S. PATENT DOCUMENTS

| | | | | |
|---|---|---|---|---|
| 3,702,434 A | * | 11/1972 | Ryan | 323/266 |
| 3,742,330 A | * | 6/1973 | Hodges et al. | 323/266 |
| 4,042,856 A | * | 8/1977 | Steigerwald | 315/246 |
| 4,251,857 A | * | 2/1981 | Shelly | 363/26 |
| 4,533,986 A | * | 8/1985 | Jones | 363/17 |
| 4,761,722 A | * | 8/1988 | Pruitt | 363/17 |
| 4,783,795 A | * | 11/1988 | Yahata | 378/105 |
| 4,999,568 A | * | 3/1991 | Gulczynski | 323/351 |
| 5,155,430 A | * | 10/1992 | Gulczynski | 323/244 |
| 6,169,391 B1 | * | 1/2001 | Lei | 323/266 |

* cited by examiner

Primary Examiner—Bao Q. Vu

(57) ABSTRACT

The switching power supplies convert AC or DC input voltage into a DC output voltage. Conventional topologies are implemented, wherein power factor correction and/or square-wave switching at resonant transition is accomplished. In a front-end, rectified line voltage is applied to an inductor that attains line current. A diode limits voltage at a front-end output to a holdup voltage stored in a capacitor. A switch selectively applies the holdup voltage to the front-end output. In a DC/DC power supply, a switch selectively applies the input voltage to an inductor that attains a current. A transformer provides primary and secondary voltages in response to the current. A voltage across the inductor is limited to the primary voltage that is stored in a capacitor. The secondary voltage is rectified and applied to another capacitor that provides the DC output voltage. No output inductor is required. Furthermore, a forward power supply employs a single output diode. A transformer-less version requires a single switch. The front-end and the DC/DC power supply can be combined for a parallel operation, wherein only two switches are required. Zero voltage/current switching is accomplished. PWM can be used.

27 Claims, 15 Drawing Sheets

SWITCHING POWER SUPPLIES INCORPORATING POWER FACTOR CORRECTION AND/OR SWITCHING AT RESONANT TRANSITION

CROSS REFERENCE TO RELATED INVENTIONS

The present invention is related by subject matter to co-pending applications filed on even date herewith and hereby incorporated by reference: "Precision Switching Power Amplifier and Uninterruptible Power System," Ser. No. 676,793 and "Switching Power Amplifier and Uninterruptible Power System Comprising DC/DC Converter for Sinusoidal Output," Ser. No. 672,986. The present invention is also related to the following U.S. Patents by the same inventor, U.S. Pat. Nos.: 6,121,756 (et al.), U.S. Pat. Nos. 6,011,702, 5,896,280 (et al.), U.S. Pat. Nos. 5,892,666, 5,736,841, 5,637,988, 5,426,413, 5,382,843, 5,270,904, 5,267,132, 5,252,974, 5,225,767, 5,221,887, 5,214,430, 5,206,649, 5,196,995, 5,173,698, 5,164,657, 5,164,656, 5,155,489, 5,155,430, 5,155,381, 5,146,399, 5,099,241, 5,057,990, 5,041,832, 4,999,568, 4,980,686, 4,980,649, 4,958,155, 4,956,760, 4,949,234, 4,947,308, 4,943,740, 4,940,982, 4,940,906, 4,929,848, 4,871,980, 4,866,398, 4,857,931, 4,853,837, 4,845,391, 4,843,392, 4,837,572, 4,829,263, 4,811,017, 4,803,610, 4,782,306, 4,763,106, 4,763,080, 4,749,958, 4,749,953, 4,736,286, 4,714,894, 4,634,996 and 4,476,441.

FIELD OF THE INVENTION

The invention relates to a switching power supply (SPS) converting an AC or DC input voltage into an unregulated high frequency AC output voltage or a regulated DC output voltage. Conventional topologies are implemented, wherein power factor correction and/or resonant operation is accomplished.

BACKGROUND OF THE INVENTION

By definition, any switch operates in binary mode. It is either turned on or turned off. However, the switch operates in linear region during a transition interval. In particular, numerous parasitic capacitances and inductances appearing in a switched circuit must be recharged. These components often form resonant networks that generate parasitic oscillations. The oscillations contribute to energy loss and always-undesirable EMI/RFI. A soft switching is used to reduce these effects. The linear region of the switch is expanded; the parasitic components are recharged at a reduced rate while the switch acts like a snubbing resistor. However, except for specific low power applications, energy loss of the switch is unacceptable. A hard and thus uncontrollable switching has exactly the opposite effect as merely losses of the switch are minimized.

Generally, resonant SPSs are inherently inferior to square-wave SPSs. The resonant SPSs develop a sinusoidal voltage and/or current. However, this is associated with a considerable interval, usually near zero crossing of the respective sinusoidal signal, when energy transfer is minimal or none. Therefore, the resonant SPSs require power semiconductors having higher current and/or voltage ratings. An output capacitor carries a high ripple current. By contrast, in the square-wave SPSs a maximum energy transfer is accomplished instantaneously.

The resonant SPSs have other inherent flaws. The resonant or switching frequency is determined by additional LC components, or an additional capacitor and leakage inductance of the power transformer. These components are fixed and so is the turn-on or turn-off time. Pulse frequency modulation (PFM) is often used to accomplish the regulation. Implementation of pulse width modulation (PWM) or other preferred switching scheme is often impractical. A minimum load may be necessary to avoid large variations of the switching frequency. Moreover, the maximum switching frequency can be quite high if it is determined by the leakage inductance. The resonant SPSs are preferred in special applications, such a high voltage conversion. General purpose resonant SPSs are costly and constitute a small fraction of all SPSs manufactured today.

Linear power supplies have tremendous advantages over SPSs. Any SPS is basically a high power oscillator that is rich with switching harmonics. Moreover, if AC line is used as the input source, numerous line frequency harmonics are created. The SPSs are therefore excellent sources of both conducted and radiated EMI. Energy is transferred from the input to the output in quanta. A current applied to an output capacitor is zero or otherwise never constant, even when the load is fixed. Therefore, the output ripple voltage delivered to the load is significantly larger. Statements about obsolescence of linear power supplies in view of apparent superiority of SPSs are common and greatly exaggerated. The staggering popularity of the linear power supplies is a clear evidence of unsolved and severe deficiencies in the SPSs. For example, a two-stage regulation is commonly used. A low-dropout (LDO) regulator follows an SPS in order to combine relatively high efficiency with low noise and fast transient response. Newest LDO regulators operate without an output capacitor, which at least maintains the gap between the linear power supplies and the SPSs.

SPSs exist only because of smaller size and weight at given output power. Generally, switching frequency and efficiency of an SPS determine its size and weight. The output ripple voltage is reduced by increasing the switching frequency and enforcing post-filtering. However, the frequency may be severely limited by a switching scheme, in particular PWM, rather than switching capabilities of real components. Post-filtering increases size and power losses, and severely affects stability and transient response. Efficiency is most effectively boosted by optimizing losses during transition intervals and minimizing conduction of switching components. Therefore, MOSFETs and synchronous rectifiers are favored. Additional reactive components are used to minimize voltages and currents that the switches endure during transition intervals. Therefore, zero-voltage and zero-current switching schemes are favored.

The performance of the power transformer operating at a high switching frequency can be understood with the help of a simplified model. Primary and secondary leakage inductances are caused by incomplete magnetic coupling between primary and secondary windings of the transformer. Primary and secondary resistances reflect copper loss of the respective windings. Skin effects further increase the resistances. The leakage inductances and the resistances are effectively coupled in series with the respective windings, wherein transformed voltages are reduced. Primary and secondary intra-winding capacitances establish resonant networks. Moreover, rapid recharging of the transformer causes current spikes. Inter-winding capacitances further contribute to performance limitations. A magnetizing inductance is determined by permeability and crossectional area of the magnetic core, and by the number of turns. A magnetizing resistance represents core loss. Eddy-current loss increasing with the switching frequency, hysteresis loss increasing with flux density and residual loss due partially to gyromagnetic resonance contribute to this resistance.

The leakage inductance of the power transformer is often the key parasitic element and the largest single factor in degrading the performance of an off-line SPS. An ideal transformer has no leakage inductance because magnetic fields generated by the primary winding are entirely contained by the core and coupled completely to the secondary winding. The leakage inductance represents magnetic fields that do not couple with both the primary and secondary windings. The inductive leakage energy is transferred to a snubber capacitor. A diode is employed for charging the capacitor to a peak voltage. However, parasitic capacitances are charged to that voltage as well. As the diode ceases the conduction, the respective resonant circuit continues to oscillate at a very high frequency. Obviously, the oscillations appear directly at the input. They are also applied to the collector or drain of the power switch, usually to its case, and further to a heat sink. Moreover, the oscillations are transferred to all other windings and are thus applied to all components connected thereto. Numerous filters, snubbers, shields and beads redistribute and reduce somewhat leakage energy that is wasted in form of heat and EMI/RFI.

The value of the leakage inductance is determined primarily by physical dimensions. For example, safety regulations of various countries require specified amounts of spacing and insulation between the windings. Turns ratio of a typical off-line transformer makes it difficult for the secondary winding to uniformly cover the primary winding. Furthermore, economics may be an overriding consideration since some core shapes are easier and less expansive to wind than others are. Transformer design becomes a tradeoff between these and other factors that always result in a significant amount of the leakage inductance.

SUMMARY OF THE INVENTION

The present invention is intended to provide SPSs incorporating power factor correction and/or switching at resonant transition. Conventional topologies are implemented. These include flyback, forward, half-bridge, full-bridge and push-pull SPSs. The invention offers the perfect compromise between the soft and hard switching schemes. Any switch is driven hard, whereas voltages across critical passive components vary at a rate predetermined by a resonant network. Therefore, the square-wave switching at a resonant transition is accomplished. Moreover, some parasitic elements of the passive components are taken into account. A front-end is added for providing power factor correction. A parallel operation is achieved, wherein energy derives from line and a holdup capacitor. Accordingly, switching components of the front-end transfer merely a fraction of energy delivered to the SPS. Yet, an input current flowing through an input inductor can be changed independently of the output current of the SPS. Only two switches are required to accomplish power factor correction and the resonant operation. No output inductor is necessary. PWM can be used. Furthermore, a forward SPS employs a single output diode. A quarter-bridge SPS employs only one switch and carries out the push-pull operation. A transformer-less SPS employs a pair of inductors and one or two switches. The SPS is capable of simultaneously regulating two output voltages having opposite polarities. In the following disclosure, the term converter refers to a block performing an essential function within a parent SPS.

The SPS according to the present invention converts an AC input voltage into an output voltage or voltages. A rectifying means rectifies the input voltage. A front-end means has a terminal coupled to the rectifying means for storing a holdup voltage and selectively applying the holdup voltage to the terminal. A converter means converts a voltage appearing at the terminal into the output voltage or voltages. An inductive means is coupled between the rectifying means and the terminal for attaining a current. A capacitive means stores the holdup voltage. A second rectifying means limits the voltage at the terminal substantially to the holdup voltage. A switching means selectively applies the holdup voltage to the terminal.

In another embodiment, the SPS converts an input voltage or voltages into a DC output voltage or voltages. A first inductive means attains a current. A switching means selectively applies the input voltage or voltages to the first inductive means. A second inductive means provides a primary voltage in response to the current. A first capacitive means stores the primary voltage. A rectifying means rectifies the primary voltage. A second capacitive means is coupled to the rectifying means for providing the DC output voltage or voltages. The second inductive means may include a third inductive means for providing a secondary voltage in response to the primary voltage, wherein the rectifying means rectifies the secondary voltage. A transformer represents the second and third inductive means that are electromagnetically coupled. A primary winding provides the primary voltage in response to the current. A secondary winding provides the secondary voltage.

In yet another embodiment, the SPS converts an input voltage into a DC output voltage or voltages. A first inductive means attains a first current. A second inductive means attains a second current. A third inductive means provides a primary voltage in response to the first and second currents. A first capacitive means stores an intermediate voltage. A switching means selectively applies the first current to the third inductive means and selectively applies the intermediate voltage to the second inductive means. A first rectifying means applies the intermediate voltage to the first inductive means and applies the second current to the third inductive means. A second rectifying means limits the primary voltage and provides the DC output voltage or voltages. A second capacitive means stores the DC output voltage or voltages.

In still another embodiment, the SPS converts an input voltage into a DC output voltage or voltages. A first inductive means attains a current. A second inductive means provides a primary voltage in response to the current. A first capacitive means stores an intermediate DC voltage. A first switching means selectively applies the intermediate DC voltage to the first inductive means. A second switching means selectively applies the current to the second inductive means. A first rectifying means applies the input voltage to the first inductive means. A second rectifying means applies the intermediate DC voltage to the second inductive means. A third rectifying means limits the primary voltage and provides the DC output voltage or voltages. A second capacitive means stores the DC output voltage or voltages.

BRIEF DESCRIPTION OF THE DRAWINGS

The present invention will become more clear in conjunction with the accompanying figures of which.

DETAILED DESCRIPTION OF THE INVENTION

Figure 1:
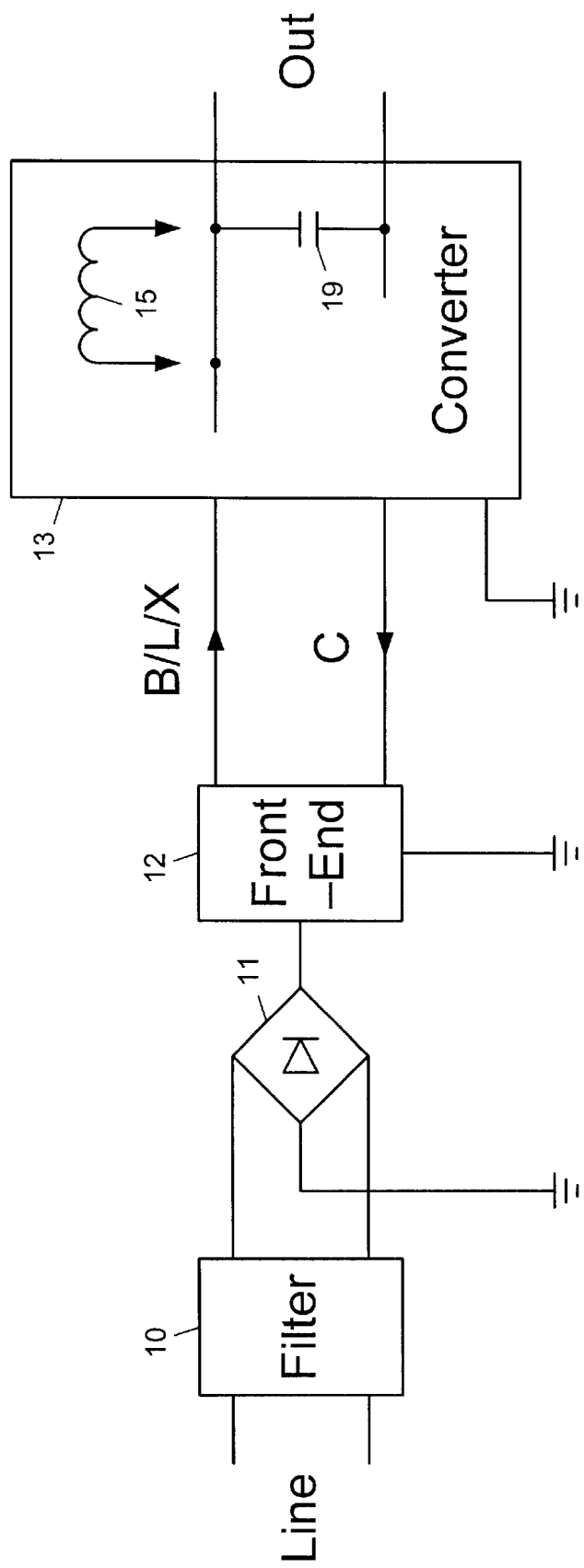
FIG. 1 is a block diagram of an SPS incorporating power factor correction.

FIG. 1 is a block diagram of an SPS incorporating power factor correction. The SPS converts the line voltage into an output voltage. A rectifying means includes the line filter 10 and the diode bridge 11 for rectifying the line voltage. Specifically, the line voltage is applied to the line filter 10. The filter 10 is bi-directional and minimizes noise transfer between line and the front-end 12. In particular, the filter 10 attenuates interference signals that may be present on line. The filter 10 minimizes also electrical noise generated by the front-end 12 and the converter 13 before reaching line. Moreover, the filter 10 may include protection devices such as inrush current limiter and transient voltage surge suppressor. The front-end 12 performs a number of functions. In particular, the front-end 12 applies the rectified line voltage to the terminal B/L/X directly or through an inductor. It stores and selectively applies a holdup voltage to the terminal B/L/X directly or through one or two inductors. The front-end 12 also clamps a voltage appearing at the terminal B/L/X to the holdup voltage. The converter 13 converts the former voltage into the output voltage of the SPS.

The filtered line voltage is applied across the bridge 11, whereas the rectified line voltage is referenced to ground. The front-end 12 produces a sinusoidal input current in response to the rectified line voltage. Energy delivered to the SPS is minimal near zero crossing of the line voltage. In particular, the line current is zero at the zero crossing. Therefore, the front-end 12 includes a holdup capacitor to provide for an uninterrupted energy flow to the converter 13. A switch is necessary to select the source of energy. Furthermore, the front-end 12 maintains the holdup voltage stored in the holdup capacitor within a predetermined range. The bridge 11, the front-end 12 and the converter 13 are grounded.

The terminal B/L/X and an optional terminal C tie together the front-end 12 and the converter 13. The label B/L/X indicates any one of three possible types of terminals: B, L or X. Accordingly, the B-, L- or X-type front-end comprises the terminal B, L or X respectively. Generally, the terminals B/L/X and C carry currents in one direction. This is marked by arrows in the drawing. The output terminal B/L/X of the front-end 12 is the input terminal B/L/X of the converter 13. The terminal B/L/X carries the current from line or the holdup capacitor to the converter 13. Unlike the front-end 12, the converter 13 may reverse polarity of that current. This is usually caused by an inductive component that is present in the converter 13 and continues to provide a current after a grounded switch opens. Any voltage spike appearing at the terminal B/L/X is limited to the holdup voltage. The optional input terminal C of the front-end 12 is the output terminal C of the converter 13. The terminal C allows clamping a voltage or voltages generated by the converter 13. Specifically, the terminal C is connected to the holdup capacitor. The holdup voltage is higher than a peak of the line voltage. Therefore, the front-end 12 is also used as an active snubber, which further increases efficiency of the SPS.

The front-end 12 can provide a high output current even when the line current is zero. However, the front-end 12 is incapable of increasing the rectified line current above the level of its output current. In order to further increase the rectified line current, the converter 13 draws an input current that is greater than a primary current necessary to produce the output current of the SPS. For example, when the line voltage peaks, the rectified line current may be significantly higher than the primary current. The B-type front-end comprises no inductor. However, if the L-type front-end 12 is used or the output of the X-type front-end 12 is inductive, an input switch or switches of the converter 13 can short the respective terminal L or X to ground. Preferably, a secondary current applied to the capacitor 19 is occasionally interrupted. This prevents substantial energy storage in the converter 13. The capacitor 19 has an increased value in order to minimize output voltage ripple of the SPS.

The converter 13 converts a voltage appearing at the terminal B/L/X into an unregulated high frequency AC output voltage or a regulated DC output voltage. In the former case, the AC output voltage usually appears across a secondary winding of a power transformer. The output inductor 15 and the output capacitor 19 are optional. A switching frequency of the converter 13 determines the frequency of the AC output voltage. The unregulated AC output voltage can be converted directly into a low frequency voltage, such as equivalent line voltage or audio signal. Therefore, an intermediate conversion is eliminated. Examples of this technique are disclosed in the co-pending applications titled "Precision Switching Power Amplifier and Uninterruptible Power System" and "Low-Cost Switching Power Amplifier and Uninterruptible Power System with Sinusoidal Output," filed on even date herewith.

Figure 6:
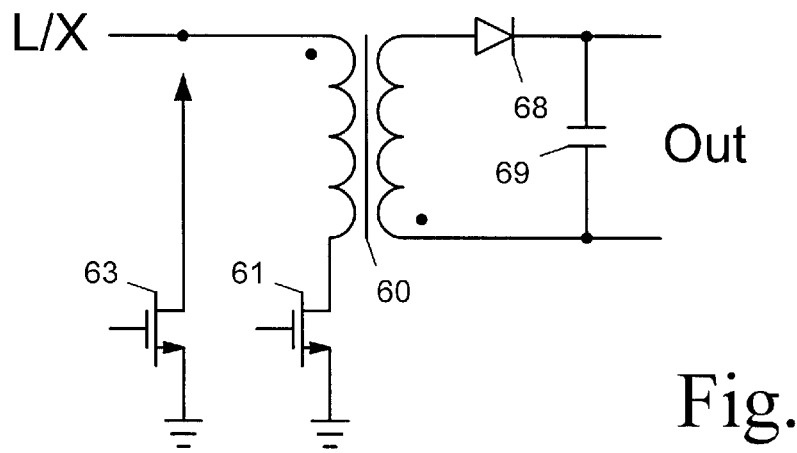
FIG. 6 is an embodiment of one- or two-switch flyback converter implementing power factor correction.
Figure 13:
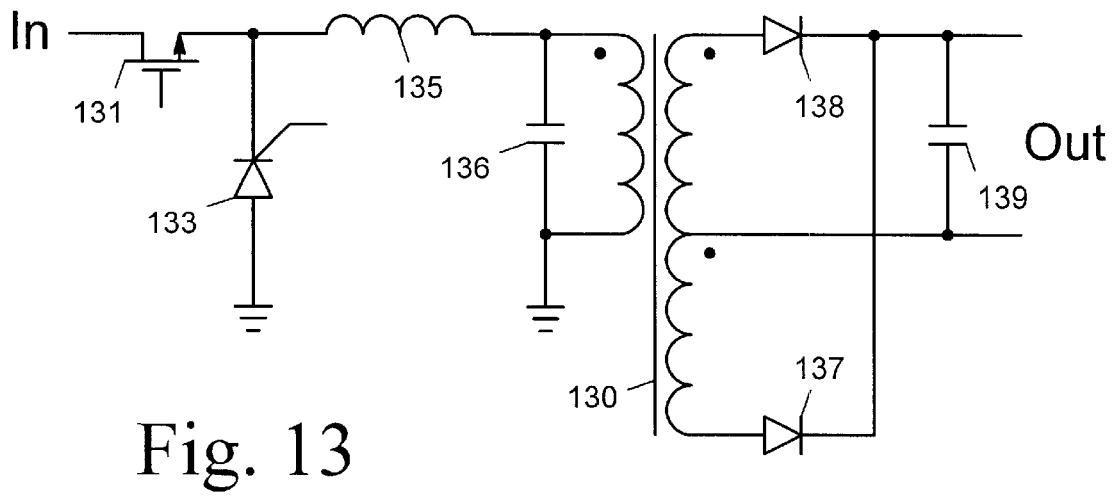
FIG. 13 is the basic embodiment of a resonant forward/flyback SPS.

The converter 13 is driven by the front-end 12 and implements thus power factor correction. The converter 13 represents any converter disclosed hereinafter. It may be based on a conventional topology or a novel resonant topology. The converter 13 provides the DC output voltage that is stored in the capacitor 19. An example of the pertinent conventional converter is shown in FIG. 6. Moreover, the converters of FIGS. 6 through 11 can be supplied from a conventional DC voltage source rather than the X-type front-end. Any SPS disclosed hereinafter is also supplied from such source. One example of a conventional DC voltage source is a battery. In another example, a bulk capacitor is substituted for the front-end 12, wherein the SPS can be used as the converter 13. An example of the novel resonant SPS is shown in FIG. 13.

The inductor 15 can be used in SPSs with or without power factor correction. The inductor 15 is optional in the SPSs that inherently limit the output current. These include the FIG. 13 embodiment. The inductor 15 is connected in series with the capacitor 19 to minimize output voltage ripple. Therefore, the inductor 15 stabilizes the output voltage. Moreover, the inductor 15 allows an efficient implementation of a specific switching scheme, particularly PWM, if the converter 13 is of resonant type. Examples of resonant converters and SPSs are shown in FIGS. 10, 11 and 13 through 28. For instance, the SPSs of FIGS. 13 and 14 use a transformer having an asymmetric secondary tap or no tap at all. This allows energy transfer to the output capacitor in a forward and/or flyback phase. Conversely, the SPS of FIG. 21 uses a transformer with a secondary center tap. Energy can be transferred only in the forward phase and there is no flyback phase. Moreover, the primary winding can be effectively shorted. In resonant converters and SPSs, parasitic oscillations can occur during a transition phase if the switch or switches remain inactive for an extended time. The employment of the inductor 15 results in a dramatic reduction of the oscillations.

The type of the converter or SPS in which the inductor 15 is used has a considerable effect on its value. The inductor 15 can have a relatively large value in the square-wave converters. The inductor 15 is intended to deliver a continuous current to the capacitor 19. For example, in the converter of FIG. 7, the second diode 77 is used to maintain the continuous current. However, the diode 77 dramatically diminishes efficiency when its forward voltage and the output voltage of the SPS are of the same order of magnitude. In the FIG. 8 converter, both output diodes share the inductor current at zero crossing of the primary voltage. This condition is stable when both input switches are turned off. Energy stored in the transformer is trapped and partly wasted. Similar remarks apply to conventional square-wave and resonant SPSs. In the former SPSs, a continuous current delivered to the output capacitor is highly desirable. In the latter SPSs, a large value of the respective output inductor is necessary in order to allow development of principal resonant waveform.

By contrast, the value of the inductor 15 is relatively small in the resonant converters and SPSs disclosed herein. These are shown in FIGS. 10, 11 and 13 through 22. The purpose of the inductor 15 is merely to drain residue energy before a successive flyback or forward phase. Consequently, a primary voltage of the transformer is substantially limited as output rectifiers continue to clamp it. Preferably, the inductor 15 delivers a continuous current to the capacitor 19 only when duty cycle of respective complementary switches is near the maximum of 50%. Otherwise, the respective transition phase can be expanded indefinitely after the inductor current drops to zero. Energy stored in the transformer is substantially depleted. Similar remarks apply to transformer-less resonant embodiments of FIGS. 23 through 28.

Figure 2:
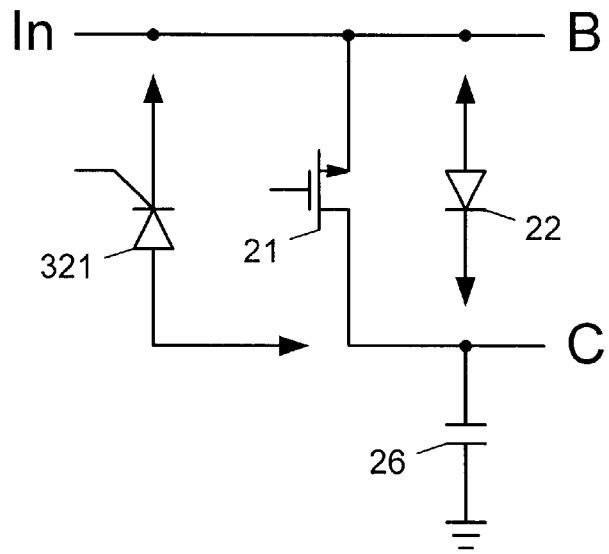
FIG. 2 is an embodiment of a B-type front-end enabling power factor correction.

FIG. 2 is an embodiment of a B-type front-end enabling power factor correction. The efficiency of the front-end is very high since the input is connected to the output terminal B. However, a line filter, such as 10 of FIG. 1, has to be more effective as the input current is frequently interrupted. The front-end drives a converter, as shown in FIG. 1. A diode bridge, such as 11 of FIG. 1, provides the rectified line voltage. This voltage is applied to the output terminal B that may be thus considered an input/output terminal. The source of the switch 21 and the anode of the optional diode 22 are connected to the terminal B. The drain of the switch 21, the cathode of the diode 22 and the grounded capacitor 26 are connected to the input terminal C. Switches used in this and the following embodiments are N-channel MOSFETs, unless otherwise noted. Preferably, the switches are capable of conducting current in either direction as to bypass an internal and/or external drain-source diode.

The capacitor 26 stores the holdup voltage. This voltage is larger than a peak of the rectified line voltage and has to be maintained within a predetermined range. However, the capacitor 26 has a large value. The holdup voltage can be restored during each period of the rectified line voltage rather than each switching cycle of the converter. A holdup time is determined by the length of time that the converter must be capable of running when line fails. If the converter represents a substantially stable load, the input voltage determines an average current applied to the capacitor 26. This current most intensely charges and discharges the capacitor 26 at the peak and at the zero crossing of the line voltage respectively. The switch 21 and possibly the diode 22 are coupled in parallel and further in series with the capacitor 26. Therefore, the order of this serial connection can be reversed if the terminal C is unused. The capacitor 26 can be connected to the terminal B. The switch 21 and the diode 22 are then grounded.

Power factor correction is accomplished by matching waveform and phase of an average waveform of the input current with the line voltage. If the input voltage is sinusoidal, such as the line voltage, the average waveform of the input current is sinusoidal as well. The input current must be zero at zero crossing of the line voltage. Conversely, the input current may peak while the output current of the converter is minimal. In particular, the switch 21 turns on if an average value of the input current is too high or an average value of the output current is too low. The switch 21 is continuously closed near zero crossing of the line voltage. A current flowing through the capacitor 26 is then equal to a difference between the input and output currents. The capacitor 26 charges up when the switch 21 conducts a reverse current or the diode 22 is forward biased. Furthermore, the capacitor 26 can charge up through the terminal C.

The switch 21 selectively applies the holdup voltage to the terminal B. The switch 21 turns on in order to decrease the holdup voltage and to compensate for some differences between the input and output currents. The input current is zero. When the switch 21 turns off, the input rectifier, such as 11 of FIG. 1, conducts the input current. The output current is equal thereto. The diode 22 is optional as marked in the drawing. The diode 22 may conduct at peaks of the line voltage. This is even necessary unless an adequate charging current is applied to the terminal B or C to charge the capacitor 26. In the former case, the input current is zero. The output current has reverse polarity that is usually caused by an input inductor of the following converter. The reverse output current charges the capacitor 26 through the switch 21, if closed, or otherwise the diode 22. The output voltage is limited to the holdup voltage.

The switch 321, a thyristor, is also optional as marked in the drawing. The switch 321 can be substituted for the switch 21. The switch 21 can turn on or off at any time. Moreover, the switch 21 delivers a superior performance particularly due to higher switching speed and lower saturation voltage. Therefore, the switch 321 merely emphasizes the possibility of using a simplified driver circuit rather than the thyristor itself. The cathode and anode of the switch 321 are connected to terminals B and C respectively. The switch 321 is triggered by a pulse applied between its gate and cathode while the output voltage is smaller than the holdup voltage. The switch 321 turns off automatically when a conducted current drops below a thyristor holding current. This current is substantially equal to zero. Therefore, the switch 321 turns off automatically when the output current reaches zero or changes polarity.

However, the inability of the switch 321 to turn off while conducting a current may be unacceptable. The employment of the fully controllable switch 31 is essential if the following converter is incapable of interrupting or discontinuing its input current. Examples of converters that the front-end can drive are shown in FIGS. 10, 11, 15 and 22. The converters of FIGS. 10 and 11 each employ an input inductor but are capable of interrupting the input current. By contrast, the converters of FIGS. 15 and 22 each employ an input inductor that is connected to the terminal B. The switch 321 is unable to turn off if the respective converter operates in a continuous mode. The switch 21 is essential in the one-switch version of the FIG. 15 converter that relies on transformer saturation.

Figure 3:
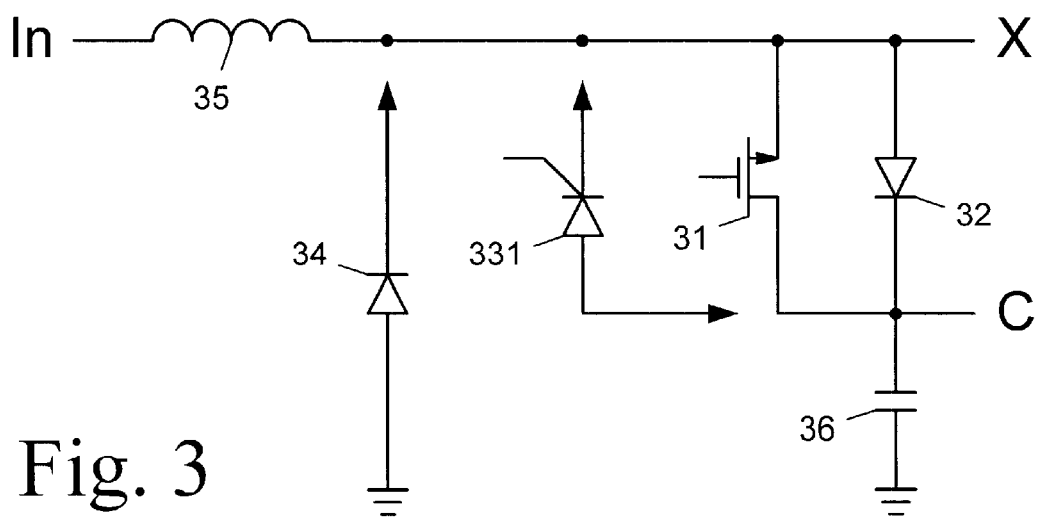
FIG. 3 is an embodiment of an X-type front-end enabling power factor correction.

FIG. 3 is an embodiment of an X-type front-end enabling power factor correction. The components 31, 32, 36 and 331 are connected as the components 21, 22, 26 and 321 of the FIG. 2 embodiment respectively. However, the diode 32 is indispensable. Moreover, the rectified line voltage is applied to the inductor 35 that separates the input from the output. The additional diode 34 is used to minimize a reverse voltage at the terminal X. The diode 34 is optional as marked in the drawing. The cathode of the diode 34 is connected to the terminal X and the anode is grounded. The holdup voltage stored in the capacitor 36 is applied to the input terminal C. The order of the serial connection of the components 31, 32 and 36 can be reversed as in the FIG. 2 embodiment. Therefore, the capacitor 36 can be connected to the terminal X while the switch 31 and the diode 32 are grounded.

The switch 31 can turn on or off at any time. In particular, the operation of a thyristor can be simulated as in the FIG. 2 embodiment. This is symbolically marked in drawing as the switch 331, a thyristor, can replace the switch 31. The switch 31 delivers a superior performance particularly due to higher switching speed and lower saturation voltage. However, the switch 321 requires a simple driver circuit that merely generates trigger pulses. The switch 331 turns off automatically when the input current of the front-end is greater than or equal to the input current of the converter. The switch 31 turns on in order to decrease the holdup voltage and to compensate for some differences between the input and output currents. The inductor 35 continues to conduct the input current. The switch 31 conducts a difference between the input and output currents. When the switch 31 turns off, the diode 34 conducts that difference. If the input current is greater than the output current, the difference charges the capacitor 36 through the switch 31, if closed, or otherwise the diode 32. Therefore, the switch 31 or the diode 32 conducts the reversed output current and limits the voltage at the terminal X to the holdup voltage.

The inductor 35 is in series with the input. The inductor 35 attains the input current, wherein an uninterrupted flow is accomplished. The output voltage is approximately equal to the holdup voltage when the switch 31 is closed or when the diode 32 conducts. In the latter case, the input current is greater than the output current. If the input and output currents are equal and the switch 31 is open, the output voltage is smaller than the input voltage. The inductor 35 and input circuitry of the converter constitute a voltage divider that determines the output voltage at the terminal X. The efficiency of the front-end remains very high since the inductor 35 is the only component transferring energy to the converter.

Figure 4:
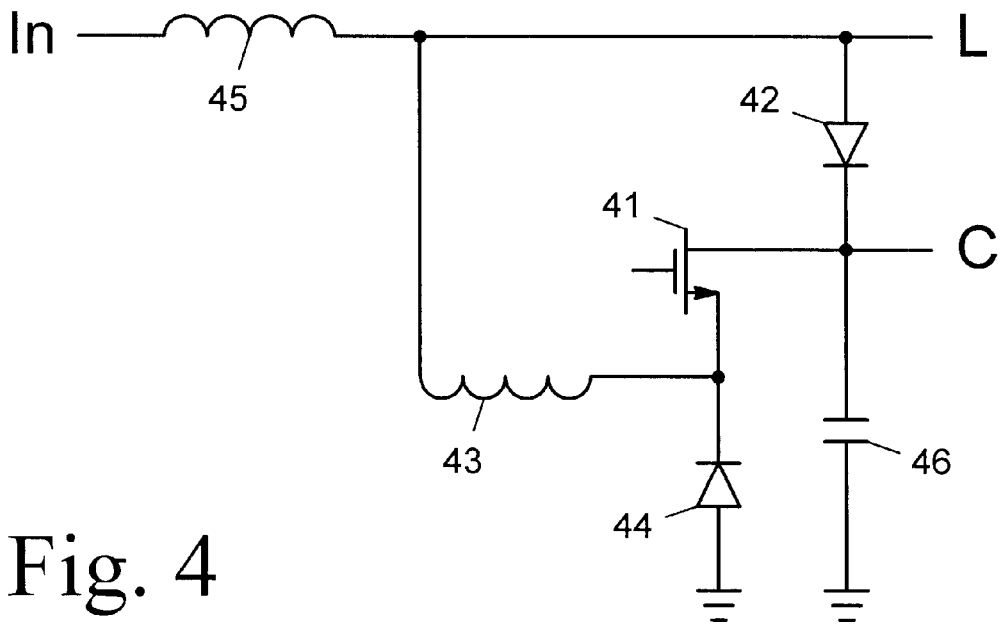
FIG. 4 is an embodiment of an L-type front-end enabling power factor correction.

FIG. 4 is an embodiment of an L-type front-end enabling power factor correction. A first inductive means is connected between the input and the output for attaining a first current. A second inductive means is connected to the output for attaining a second current. A switching means selectively applies the holdup voltage to the second inductive means. A rectifying means applies the second current to the output capacitor. Specifically, the inductor 45 applies the input voltage to the output terminal L. The output voltage appears thereat. The anode of the diode 42 and one end of the inductor 43 are also connected to the terminal L. The other end is tied to the source of the switch 41 and the cathode of the diode 44. The drain of the switch 41, the cathode of the diode 42 and the capacitor 46 are connected to the input terminal C. The anode of the diode 44 and the capacitor 46 are grounded.

Currents of the inductors 43 and 45 are unidirectional. The input current of the front-end flows through the inductor 45 that is connected in series with the input. The inductor 43 carries a difference between the input and output currents if the diode 42 is nonconductive. A sum of the inductor currents is applied to the terminal L. If that sum is greater than the output current of the front-end, the diode 42 conducts. The output voltage is approximately equal to the holdup voltage. The current of the inductor 45 increases whenever the input voltage is greater than the output voltage. By contrast, the current of the inductor 43 increases only when the diodes 42 and 44 are cut off. Accordingly, the switch 41 is turned on and the output voltage is smaller than the holdup voltage.

The switch 41 turns on in order to decrease the holdup voltage and to compensate for some differences between the input and output currents. In particular, the switch 41 and the inductor 43 carry the output current near zero crossing of the line voltage. If the switch 41 is turned off, the diode 44 conducts the current of the inductor 43 and the voltage thereacross is approximately equal to the output voltage. Therefore, the diode 44 indirectly applies the current of the inductor 43 to the terminal L. The capacitor 46 stores the holdup voltage that is larger than the peak of the input voltage. The capacitor 46 discharges whenever the inductor 43 charges up. The capacitor 46 charges up when the diode 42 conducts. A charging current may be also applied to the terminal C. The L-type front-end has a major advantage over the B-type front-end of FIG. 2 and the X-type front-end of FIG. 3. The output is inductive regardless of the state of the switch 41. This feature is comparable to short circuit protection. Unless the diode 42 conducts, the front-end is equivalent to an inductor carrying the output current at the terminal L. The front-end is therefore suitable for a current-fed operation of converters.

Figure 5:
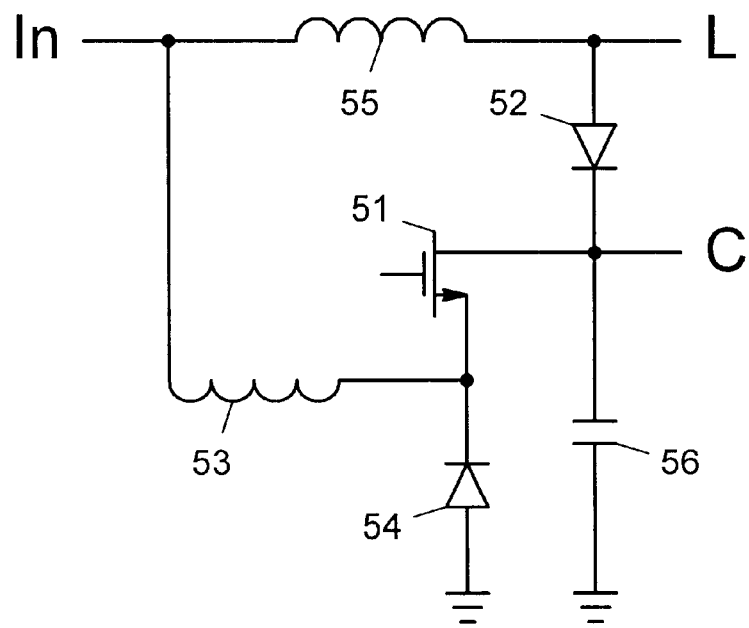
FIG. 5 is another embodiment of an L-type front-end enabling power factor correction.

FIG. 5 is an embodiment of an L-type front-end enabling power factor correction. The components 51, 52 and 54 through 56 are connected as the components 41, 42 and 44 through 46 of the FIG. 4 embodiment respectively. The inductor 53 corresponds to the inductor 43 of the FIG. 4 embodiment. One end of the inductor 53 is connected to the source of the switch 51 and the cathode of the diode 54, similar to the FIG. 4 embodiment. However, the other end is connected to the input. Consequently, the diode 54 indirectly applies the current of the inductor 53 to the input, when the switch 51 is turned off. Currents of both inductors 53 and 55 are unidirectional. The current of the inductor 53 is smaller than or equal to the current of the inductor 55. The input current is equal to a difference between the inductor currents. Consequently, the input current is zero if the inductor currents are even. An input rectifier, such as 11 of FIG. 1, is cut off. The holdup and output voltages appear at the input terminal C and the output terminal L respectively.

The output of the front-end is inductive regardless of the state of the switch 51 as in the FIG. 4 embodiment. The output voltage is limited to the holdup voltage. The diode 52 conducts if the current of the inductor 55 is greater than the output current. The voltages at the terminals C and L are approximately equal. Otherwise, the current of the inductor 55 is equal to the output current. The switch 51 is energized to increase the current of the inductor 53 and to decrease the holdup voltage. When the switch 51 is turned off, the diode 54 conducts the current of the inductor 53. If that current is smaller than the current of the inductor 55, the input voltage is equal to the rectified line voltage. Otherwise, both currents are even and the input voltage is greater than or equal to the rectified line voltage. This occurs particularly near zero crossing of the line voltage.

FIG. 6 is an embodiment of one- or two-switch flyback converter implementing power factor correction. The converter derives from the ordinary flyback SPS that is supplied from a conventional DC voltage source. The input terminal is labeled L/X as to indicate that the input voltage derives from an L- or X-type front-end. This is also in accordance with the block diagram of FIG. 1. The X-type front-end is disclosed in FIG. 3. In particular, a series coupled input inductor is employed. The X-type front-end with the switch 331 is preferred since the flyback transformer 60 inherently converts the input voltage into a secondary current. The L-type front-end is disclosed in FIGS. 4 and 5. The input voltage at the terminal L/X is applied to the drain of the switch 63 and the primary winding. The switch 63 is optional as marked in the drawing. The primary winding is further tied to the drain of the switch 61. The sources of the switches 61 and 63 are grounded. The diode 68 and the capacitor 69 are connected in series across the secondary winding. The cathode of the diode 68 is connected to the capacitor 69 that stores the output voltage of the converter.

When the switch 61 turns on, the input voltage is applied across the primary winding. The input voltage determines a rate at which the primary current of the transformer 60 increases. The primary and secondary windings are polarized so that the diode 68 is cut off. When the switch 61 turns off, energy stored in the transformer 60 is delivered through the diode 68 to the capacitor 69. Any differences between a current drawn from line and the primary current are resolved in the converter and the preceding front-end. In the X-type front-end with the switch 331, that switch turns off automatically when the rectified line current is greater than or equal to the primary current. In order to turn off that switch, it may be thus necessary to turn off the switch 61 first.

Any front-end disclosed herein is incapable of increasing the rectified line current above the level of the current delivered to the converter. The optional switch 63 is activated if it is necessary to generate the rectified line current greater than the desired primary current. For example, when the line voltage peaks, the rectified line current may be significantly higher than the primary current. Preferably, the switch 61 is turned off. It is also necessary that the respective switch of the X-type front-end be turned off in order to avoid short circuit condition. The switch 63 reduces the input voltage substantially to zero as the input is shorted to ground. The input current of the converter increases while the primary current of the transformer 60 is zero.

However, the switch 63 is unnecessary to draw the increased input current. Main advantages of this method are utter simplicity and reduced cost of the converter. The primary current increases when the switch 61 is closed. In order to increase the input current of the converter beyond the desirable primary current, the transformer 60 is not reset. Therefore, the converter operates in a continuous mode with an increased magnetizing current. The input current is approximately equal thereto. Moreover, the transformer 60 can be intentionally saturated as to simulate closing of the switch 63. Accordingly, this is permissible only if the L-type front-end is used or if the X-type front-end has the inductive output. Transformer saturation may cause smaller power loss than the continuous mode.

Figure 7:
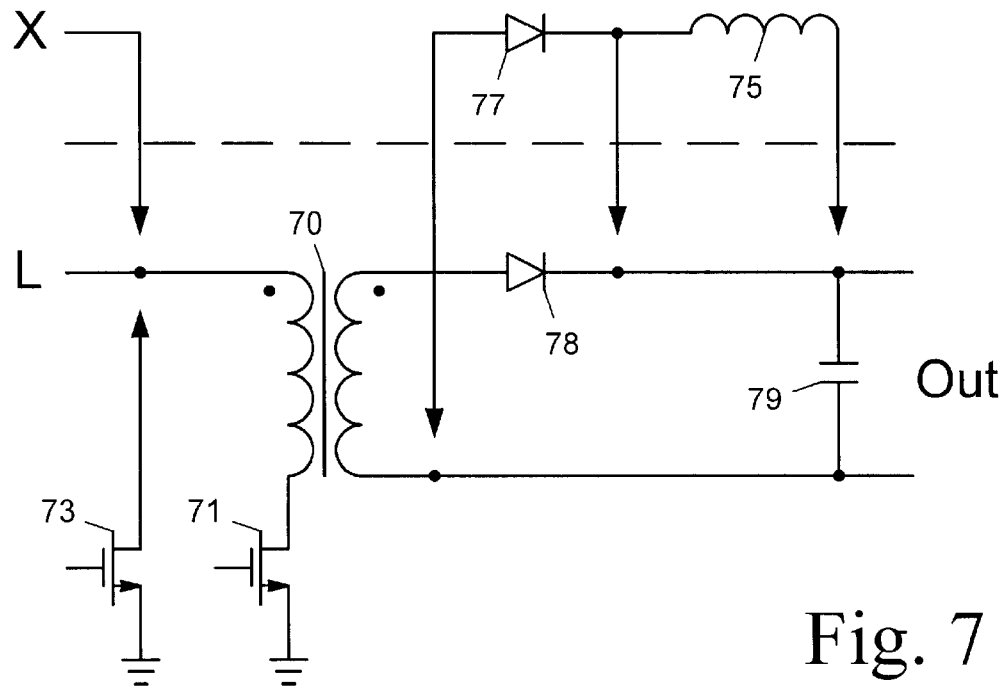
FIG. 7 is an embodiment of one- or two-switch forward converter implementing power factor correction.

FIG. 7 is an embodiment of one- or two-switch forward converter implementing power factor correction. The converter derives from the ordinary forward SPS that is supplied from a conventional DC voltage source rather than the X-type front end. The components 70, 71, 73, 78 and 79 are connected as the components 60, 61, 63, 68 and 69 of the FIG. 6 converter respectively. However, the windings of the transformer 70 are polarized for the forward operation. The converter is supplied from the X-type front-end of FIG. 3 or the L-type front-end of FIG. 4 or 5. The L-type front-end is preferred. The switch 73 is optional as marked in the drawing, regardless of which front-end is implemented. The switch 73 turns on to increase the input current of the converter while the primary current of the transformer 70 is zero. The respective switch of the X-type front-end and, preferably, the switch 71 are turned off. The switch 73 is unnecessary if the continuous mode of operation or transformer saturation is acceptable, similar to the FIG. 6 embodiment.

With the L-type front-end, the converter is current-fed. The L-type front-end has an inductive output, wherein the converter requires no output inductor. Therefore, the single output diode 78 can be used. This is in sharp contrast to the conventional forward SPS that requires an output inductor and, consequently, a second output diode. When the switch 71 is turned on, the secondary current is proportional to the primary current. The latter current is equal to an output current of the front-end and is carried by the respective inductor or inductors. Moreover, the primary voltage at the input terminal L is equal to a reflected forward voltage. The diode 78 conducts the secondary current. The secondary voltage is approximately equal to a sum of the forward voltage of the diode 78 and the output voltage of the converter. The reflected voltage is the secondary voltage multiplied by the turns ratio of the transformer 70.

When the switch 71 turns off, the secondary current is interrupted, as the diode 78 is reverse biased. Transformer reset is carried out as in the conventional forward SPS. Therefore, this feature is not shown in the drawing for simplicity. For example, a snubber can be connected across the primary winding. Moreover, a clamp consisting of a diode can be used if the L-type front-end drives the converter. Specifically, the anode and cathode of the additional diode are connected to the drain of the switch 71 and the terminal C respectively. The additional diode limits a voltage across the switch 71 to the holdup voltage. However, transformer reset is delayed until the output current of the front-end drops to level of the magnetizing current. The additional diode corresponds to the diode 162 of FIG. 16.

If the X-type front-end drives the converter, the components 75 and 77 are added. This is marked by the dashed line in the drawing. Specifically, the cathode of the diode 77 and the inductor 75 are connected to the cathode of the diode 78. The inductor 75 is in series with the capacitor 79. The anode of the diode 77 is connected to the capacitor 79 and the respective end of the secondary winding. The X-type front-end demonstrates low output impedance when the respective switch applies the holdup voltage to the input terminal X. As a result, the inductor 75 is necessary in order to limit the primary and secondary currents of the transformer 70. When the switch 71 is turned on, the secondary current flows through the diode 78 and the inductor 75. When the switch 71 is turned off, the current of the inductor 75 continues to flow through the diode 77. Preferably, that inductor current is continuous.

When the switch of the X-type front-end is closed, the input voltage is approximately equal to the holdup voltage. When that switch is open, the input voltage depends on the line and primary currents. Specifically, the inductor of the front-end carries the rectified line current. If this current is greater than the primary current, the input voltage is approximately equal to the holdup voltage. In the X-type front-end with the switch 331, that switch turns off automatically when the rectified line current is greater than or equal to the primary current. Therefore, the switch 71 has to turn off first if the rectified line current is smaller than the primary current. By contrast, in the X-type front-end with the switch 31, that switch can turn off at any time. If the rectified line current is smaller than the primary current, the input voltage is near zero. If both currents are equal, the input voltage depends on voltage drop across the inductor 75.

Figure 8:
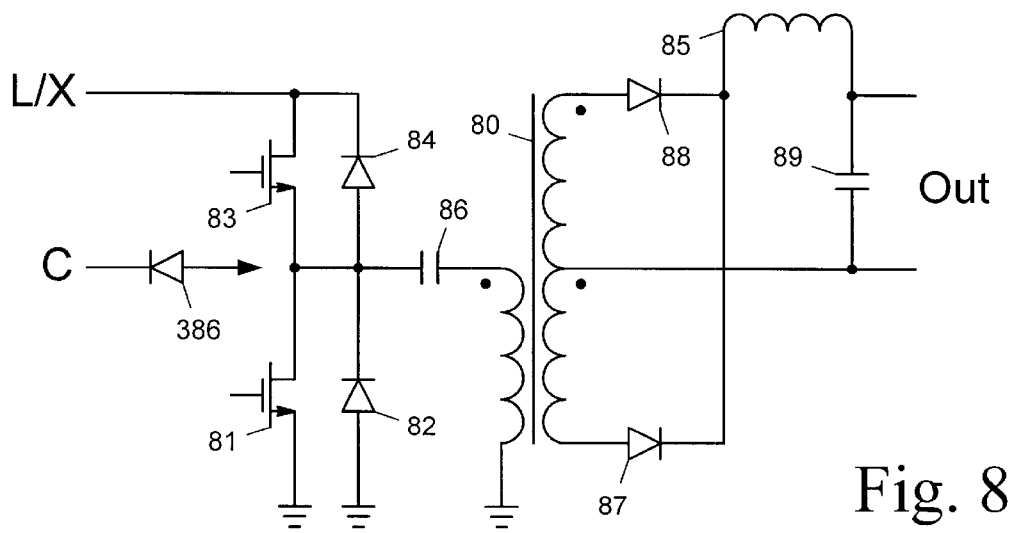
FIG. 8 is an embodiment of a half-bridge converter implementing power factor correction.

FIG. 8 is an embodiment of a half-bridge converter implementing power factor correction. The converter derives from the ordinary half-bridge SPS that is supplied from a conventional DC voltage source. The converter is supplied from the L- or X-type front-end, wherein the X-type front-end with the switch 331 is preferred. The input voltage appearing at the input terminal L/X is applied to the drain of the switch 83 and the cathode of the diode 84. The capacitor 86 is connected to the drain of the switch 81, the source of the switch 83, the cathode of the diode 82 and the anode of the diode 84. The anode of the optional diode 386 is also connected to this junction. The cathode of the diode 386 is tied to the output terminal C. The capacitor 86 is in series with the primary winding of the transformer 80. The source of the switch 81, the anode of the diode 82 and the primary winding are grounded. The diodes 87 and 88 have anodes connected across the secondary winding. The inductor 85 has one end connected to the cathodes of the diodes 87 and 88. The output capacitor 89 is connected between the other end and the secondary center tap for providing the output voltage of the converter.

When the switch 81 is turned on, the switch 83 is initially turned off. An intermediate DC voltage stored in the capacitor 86 is applied across the primary winding. The diode 87 conducts the current of the inductor 85. When the switch 81 turns off, a leakage inductance of the transformer 80 causes a voltage spike at the terminal L/X. However, that spike is limited to the holdup voltage by the diode 84 and an internal diode of the front-end, such as 32 of FIG. 3. The optional diode 386 clamps the spike more efficiently, wherein the diode 84 is then superfluous. When the switch 83 is turned on and the switch 81 is turned off, the input voltage reduced by the intermediate voltage is applied across the primary winding. The diode 88 conducts the current of the inductor 85. When the switch 83 turns off, the diode 82 limits a reverse voltage induced by the primary winding. The inductor 85 is required even when the converter is driven by the L-type front-end.

Both switches 81 and 83 can be closed simultaneously. Therefore, the converter gets around a switch coupled between the terminal L/X and ground, such as 63 of FIG. 6 and 73 of FIG. 7. The switches 81 and 83 are activated concurrently to increase and maintain the input current above the primary current. Specifically, when the switches 81 and 83 are turned off and on respectively, the input current is equal to the primary current and charges the capacitor 86. When both switches change states, the primary current discharges the capacitor 86. The input current is zero as the terminal L/X is effectively disconnected. However, if the switch 83 turns on, the input terminal L/X is effectively shorted to ground and the input current increases. In particular, the input current may be significantly higher than the primary current when the line voltage applied to the front-end peaks. Only one switch 81 or 83 can be closed if the X-type front-end has low output impedance. The switch 31 or 331 of the FIG. 3 embodiment sets off this condition.

Figure 9:
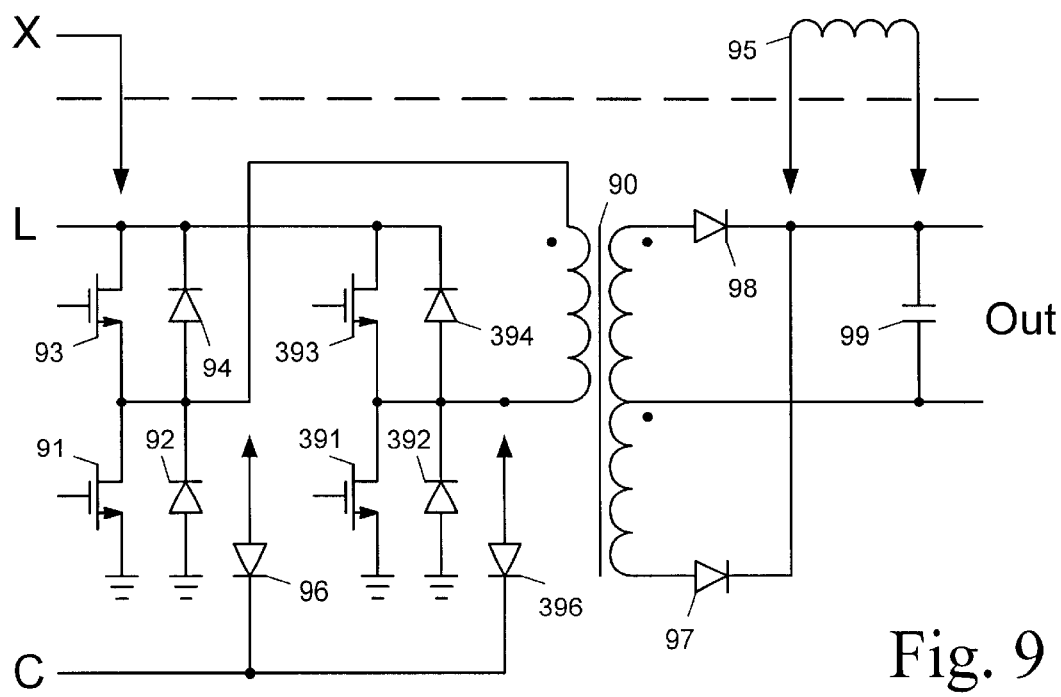
FIG. 9 is an embodiment of a full-bridge converter implementing power factor correction.

FIG. 9 is an embodiment of a full-bridge converter implementing power factor correction. The converter derives from the ordinary full-bridge SPS that is supplied from a conventional DC voltage source rather than the X-type front end. With reference to the half-bridge converter shown in FIG. 8, the series coupled capacitor is replaced with switches and diodes. The converter is supplied from the L- or X-type front-end. The L-type front-end is preferred, wherein the output inductor is unnecessary. This is marked by the dashed line in the drawing. Specifically, the input voltage appearing at the input terminal L or X is applied to the drains of the switches 93, 393 and the cathodes of the diodes 94, 394. One end of the primary winding of the transformer 90 is connected to the drain of the switch 91, the source of the switch 93, the cathode of the diode 92 and the anode of the diode 94. The other end is connected to the drain of the switch 391, the source of the switch 393, the cathode of the diode 392 and the anode of the diode 394. The sources of the switches 91, 391 and the anodes of the diodes 92, 392 are grounded.

The optional diodes 96 and 396 have the anodes connected to the cathodes of the diodes 92 and 392 respectively, i.e. across the primary winding. The cathodes of the diodes 96 and 396 are tied to the output terminal C. With these diodes, the diodes 94 and 394 are superfluous. The diodes 97 and 98 have anodes connected across the secondary winding and cathodes coupled to the output capacitor 99. The optional inductor 95 is in series with the capacitor 99. In contrast with the FIG. 8 embodiment, the inductor 95 is required only if the converter is driven by the X-type front-end. The capacitor 99 is further connected to the center tap of the secondary winding for storing the output voltage of the converter.

When the switches 93, 391 are turned on and the switches 91, 393 are turned off, the input voltage is applied across the primary winding. The diode 98 conducts a secondary current. That current is proportional to the input current of the converter and thus the output current provided by the front-end. All switches change states in order to reverse polarity of the primary voltage. The diode 97 conducts the secondary current. If the L-type front-end is used, the input voltage is equal to a reflected voltage that is proportional to the output voltage of the converter. If the X-type front-end is used, the input voltage depends also on a voltage drop across the inductor 95. When the switches 91, 393 or 93, 391 turn off, the respective diodes 94, 392 or 92, 394 conduct a leakage current of the transformer 90. An internal diode of the front-end, such as 42 of FIG. 4, limits the input voltage to the holdup voltage. The optional diodes 96 and 396 accomplish a more efficient clamping. The switches 91, 93 or 391, 393 can be turned on simultaneously to increase and maintain the input current above the primary current. The state of the remaining two switches is insignificant.

Figure 10:
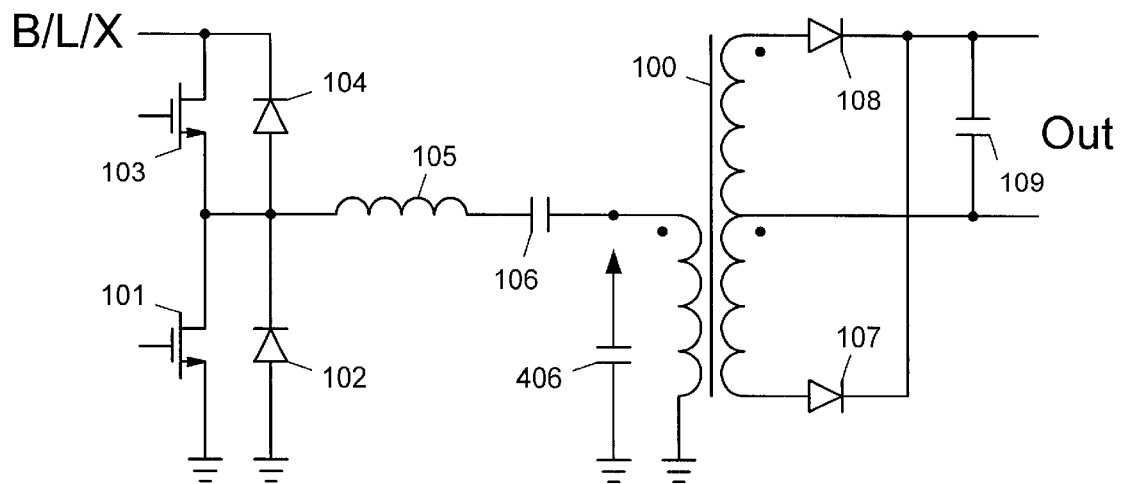
FIG. 10 is an embodiment of a half-bridge converter implementing power factor correction and allowing the resonant operation.

FIG. 10 is an embodiment of a half-bridge converter implementing power factor correction and allowing the resonant operation. The components 100 through 104 and 106 through 109 are connected as the components 80 through 84 and 86 through 89 of the FIG. 8 converter respectively. However, the instant converter can be also driven by the B-type front-end. Therefore, the drain of the switch 103 and the cathode of the diode 104 are connected to the input terminal B/L/X. The X-type front-end with the switch 331 is preferred. Moreover, the inductor 105 is in series with the capacitor 106, whereas the secondary side of the transformer 100 lacks any inductor. The source of the switch 101, the anode of the diode 102 and the primary winding of the transformer 100 remain grounded. The cathode of the diode 104 can be connected to the output terminal C in order to accomplish a more efficient clamping, similar to the diode 386 of FIG. 8. A DC/DC SPS is carried out by substituting a DC input source for the front-end. Moreover, the capacitor 106 is superfluous if another supply voltage is added. Specifically, a positive supply voltage is applied to the drain of the switch 103 and the cathode of the diode 104. A negative supply voltage is applied to the source of the switch 101 and the anode of the diode 102. The optional capacitor 406 and the primary winding remain grounded.

Figure 14:
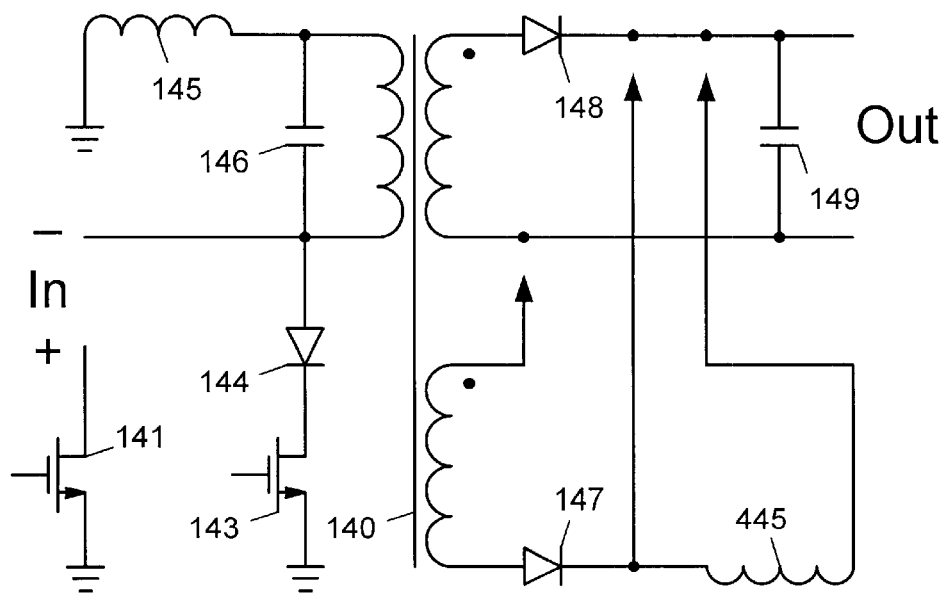
FIG. 14 is the preferred embodiment of a resonant flyback, forward or forward/flyback SPS.

Embodiments comprising the half-bridge converter with a primary inductor are also disclosed in the co-pending applications filed on even date herewith. Specifically, these embodiments are shown in FIGS. 4, 5, 11, 12 of the application titled "Precision Switching Power Amplifier and Uninterruptible Power System" However, each embodiment of this application requires a pair of additional diodes for limiting voltages across the input inductor and a primary winding of the respective transformer. These diodes are superfluous in the instant converter since the primary voltage is inherently limited to a reflected voltage. The reflected voltage is the secondary voltage multiplied by the turns ratio of the transformer 100 while the diode 107 or 108 conducts. Nevertheless, a pair of additional diodes connected in series between the terminal C and ground can be used. Both diodes are connected to a common junction of the inductor 105 and the capacitor 106 to limit spikes and minimize ringing appearing across the primary winding. This feature is illustrated in FIG. 14 of the co-pending application titled "Low-Cost Switching Power Amplifier and Uninterruptible Power System with Sinusoidal Output." The pertinent diodes 345 and 346 of that embodiment are optional.

The switch 101 turns on in order to produce negative primary voltage. The switch 103 is turned off. The inductor 105 and the primary winding constitute a voltage divider. An intermediate DC voltage stored in the capacitor 106 is applied across the divider. The intermediate voltage is greater than the reflected voltage. The diode 107 conducts when the transformer 100 and the inductor 105 are sufficiently recharged. The primary voltage is negative and has the amplitude of the reflected voltage. The increasing inductor current is equal to the primary current. When the switch 101 turns off, the diode 104 takes over the inductor current. The voltage at the terminal B/L/X is limited to the holdup voltage by an internal diode of the front-end, such as 32 of FIG. 3.

Similarly, the switch 103 turns on while the switch 101 is turned off to develop positive primary voltage. The input voltage reduced by the intermediate voltage is applied across the primary winding through the inductor 105. That voltage difference is greater than the reflected voltage. The diode 108 conducts when the transformer 100 and the inductor 105 are sufficiently recharged. The primary voltage is equal to the reflected voltage. When the switch 103 turns off, the diode 102 applies the inductor current to ground. The switches 101 and 103 are activated concurrently to increase and maintain the input current above the primary current, similar to the switches 81 and 83 of FIG. 8. An intermediate DC voltage is applied across the inductive voltage divider. Only one switch 101 or 103 can be closed if the B-type front-end is used or the X-type front-end has low output impedance. For example, the switch 331 of the FIG. 3 embodiment selectively applies the holdup voltage to the terminal X.

The resonant operation is accomplished by adding the capacitor 406 in parallel with the primary winding as marked in the drawing. If duty cycle of the switching frequency is near 50%, parasitic oscillations are inherently eliminated. Otherwise, inactivity of the switches 101 and 103 may be sufficiently long so that the inductor current drops to the level of the magnetizing current. As a result, the oscillations develop in the transition phase. The oscillations are severely suppressed by implementing an output inductor, such as 15 of FIG. 1. Residue energy stored in the transformer 100 and the capacitor 106 is substantially depleted. Unlike conventional SPSs of forward type, the output inductor has a small value. This prevents simultaneous conduction of the diodes 107, 108 and consequent waste of energy. The resonant operation is discussed in detail starting with the description of the FIG. 13 SPS.

Figure 11:
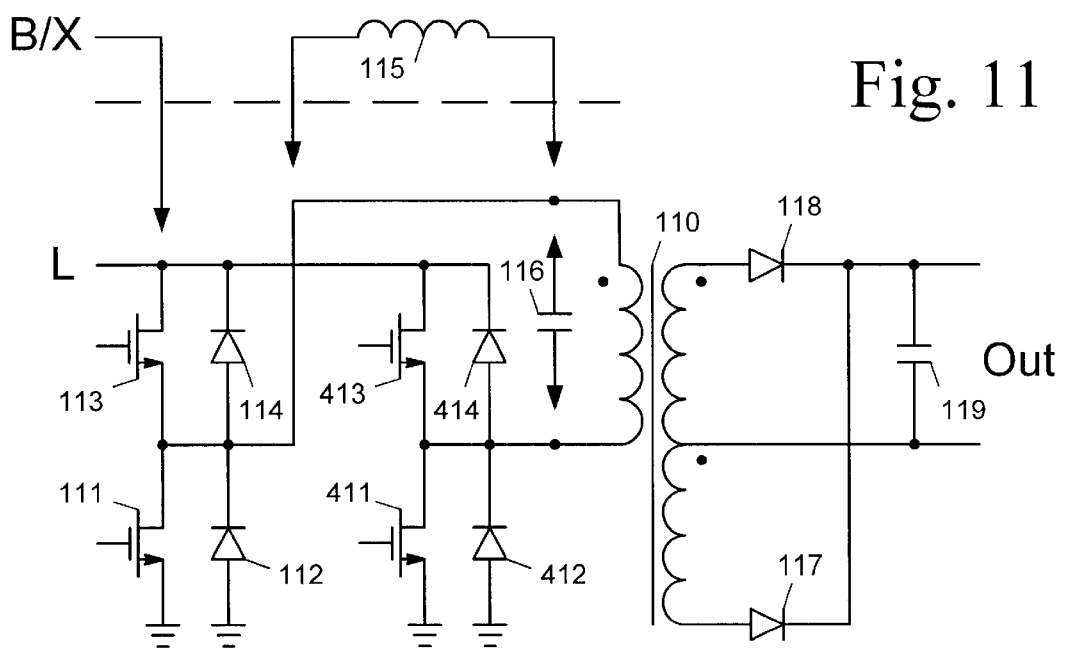
FIG. 11 is an embodiment of a full-bridge converter implementing power factor correction and allowing the resonant operation.

FIG. 11 is an embodiment of a full-bridge converter implementing power factor correction and allowing the resonant operation. The components 110 through 114, 117 through 119 and 411 through 414 are connected as the components 90 through 94, 97 through 99 and 391 through 394 of FIG. 9 respectively. The instant converter and the FIG. 9 converter are identical if driven by the L-type front-end. However, the instant converter can be also driven by the B-type front-end. Therefore, the switches 113, 413 and the diodes 114, 414 are connected to the input terminal B/X or L. The converter implements the input inductor 115 if the B- or X-type front-end is used. The X-type front-end with the switch 331 is preferred.

The inductor 115 is used only if the converter is driven by the B- or X-type front-end. This is marked by the dashed line in the drawing. The inductor 115 is tied to the drain of the switch 111, the source of the switch 113, the cathode of the diode 112 and the anode of the diode 114. The inductor 115 is also in series with the primary winding of the transformer 110. No output inductor is used. The cathodes of the diodes 114 and 414 can be connected to the terminal C in order to accomplish a more efficient clamping, similar to the diodes 96 and 396 of FIG. 9. A DC/DC SPS can be carried out by substituting a DC input source for the B- or X-type front-end. The resonant operation is accomplished by adding the capacitor 116 in parallel with the primary winding as in the FIG. 10 converter. The resonant operation is discussed in detail starting with the description of the FIG. 13 SPS.

Figure 15:
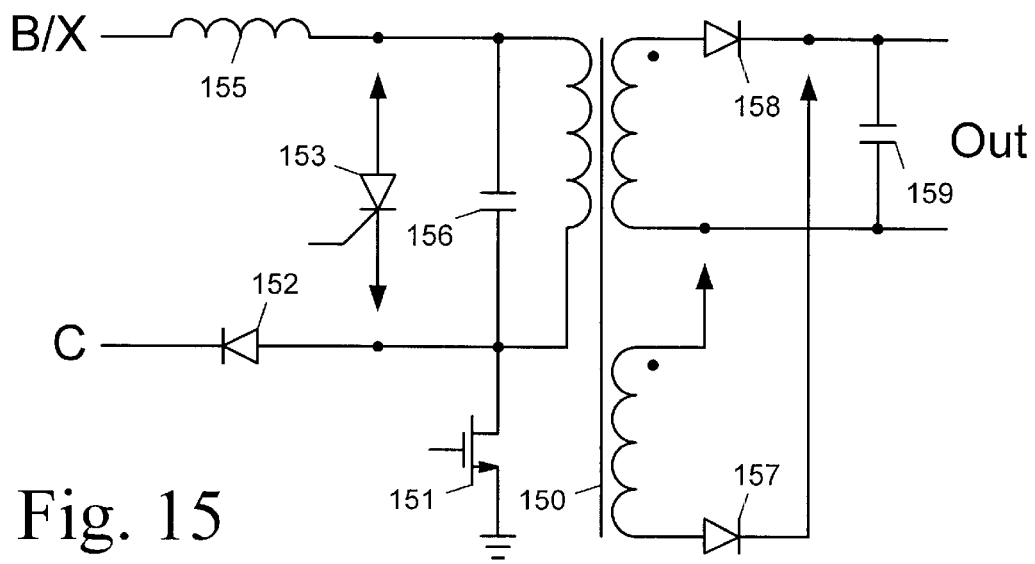
FIG. 15 is an embodiment of one- or two-switch resonant flyback, forward or forward/flyback converter implementing power factor correction.

Moreover, an equivalent full-bridge converter with a forward transformer and current output is depicted in FIG. 15 of the co-pending application. The application is titled "Low-Cost Switching Power Amplifier and Uninterruptible Power System with Sinusoidal Output" and filed on even date herewith. However, a circuit on the secondary side of the respective transformer is inapplicable. The embodiment of FIG. 15 also employs the optional diodes 355 and 356 to limit spikes and minimize ringing appearing across the primary winding of the transformer. A pair of equivalent diodes can be used in the instant converter if the B- or X-type front-end is used. The additional diodes are connected in series between the terminal C and ground. Both diodes are connected to a common junction of the inductor 115 and the primary winding.

When the switches 113, 411 are turned on and the switches 111, 413 are turned off, the input voltage is applied to one end of the primary winding directly or through the inductor 115. The other end is effectively grounded. The primary voltage is equal to the reflected voltage when the diode 118 conducts. All switches change states in order to reverse polarity of the primary voltage. When the transformer 110 and the inductor 115 are sufficiently recharged, the diode 117 conducts and the primary voltage reaches the reflected voltage. When all switches are turned off, the diodes 114, 412 or 112, 414 conduct. The current of the inductor 115 or the leakage current of the primary winding is applied to the terminal B/X or L respectively. The voltage thereat is limited to the holdup voltage by an internal diode of the front-end, such as 32 of FIG. 3. If the respective switch of the X-type front-end is open or the L-type front-end is used, all switches can switch simultaneously, thus avoiding dead time. Moreover, the switches 111, 113 or 411, 413 can turn on simultaneously to increase and maintain the input current above the primary current.

Figure 12:
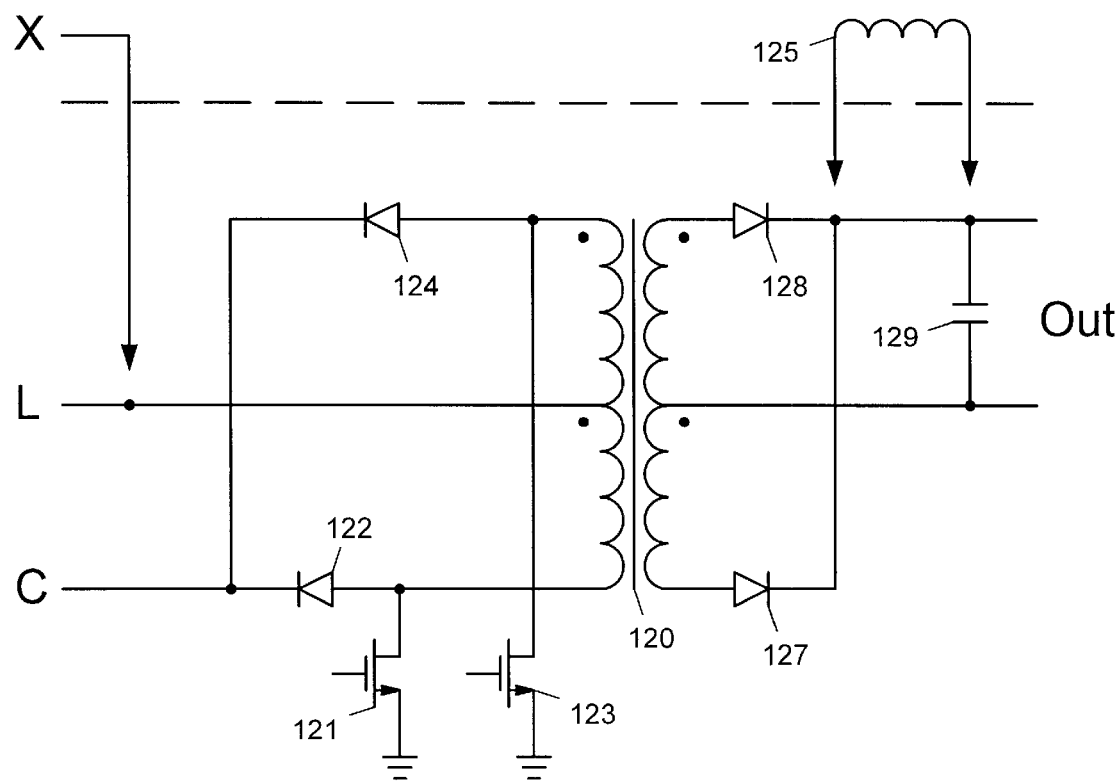
FIG. 12 is an embodiment of a push-pull converter implementing power factor correction.

FIG. 12 is an embodiment of a push-pull converter implementing power factor correction. The converter is supplied from the L- or X-type front-end. The L-type front-end is preferred, wherein the output inductor is unnecessary. This is marked by the dashed line in the drawing. The input voltage at the input terminal L is applied to the primary center tap of the transformer 120. One end of the primary winding is tied to the drain of the switch 121 and the anode the diode 122. The other end is tied to the drain of the switch 123 and the anode the diode 124. The cathodes of the diodes 122 and 124 are connected to the output terminal C. The sources of the switches 121 and 123 are grounded. The diodes 127 and 128 have anodes connected across the secondary winding and cathodes coupled to the output capacitor 129. The optional inductor 125 is in series therewith. The capacitor 129 is further connected to the center tap of the secondary winding for storing the output voltage of the converter.

When the switch 121 is turned on, the primary current is applied to ground. The primary voltage appears across the respective half of the primary winding and is thus approximately equal to the input voltage. Energy is delivered to the capacitor 129 when the diode 128 conducts. If the L-type front-end is used, the input voltage is equal to a reflected voltage that is proportional to the output voltage of the converter. If the X-type front-end is used, the input voltage depends also on a voltage drop across the inductor 125. When the switch 121 turns off, the primary current is applied to the holdup capacitor. Specifically, the primary current is equal to the input current that is maintained by an inductor or inductors of the front-end. The diodes 122 and 124 share the input current and apply it to the terminal C. The primary voltage is near zero. This balance remains until the switch 123 turns on or an inductor current of the front-end drops to the level of the magnetizing current of the transformer 120. The switch 123 turns on and off to complete the switching cycle, wherein the operation of the converter is analogous.

The input voltage at the terminal L or X can reach the level of the holdup voltage at the terminal C. However, only the X-type front-end can demonstrate low output impedance when the respective switch is closed. Otherwise, conduction phases of the switches 121 and 123 can overlap. When this occurs, the primary voltage is near zero. By these means, the input current is increased, whereas no energy is delivered to the capacitor 129. The input voltage is also limited to the holdup voltage appearing at the terminal C. Therefore, the holdup voltage determines voltage ratings of the switches 121, 123 and the diodes 122, 124. The biggest advantages of the push-pull converter are simplicity and capability of delivering high output power. The biggest disadvantage is double voltage ratings of semiconductors used in the primary circuitry. However, this flaw is inapplicable to the instant push-pull converter.

For example, the front-end and the converter can handle the universal line voltage. The holdup voltage may be set to mere 400 Vdc rather than anticipated 800 Vdc. An output inductor or inductors of the front-end are also coupled to the primary center tap. With the switch 121 or 123 closed, the respective half of the primary winding completes a voltage divider. If the L-type front-end is used, the voltage appearing at the primary center tap is limited to the reflected voltage. With the X-type front-end, a smaller turns ratio of the transformer 125 is chosen in order to compensate for the voltage drop across the inductor 125. In either case, the primary voltage is less than 200 Vdc, which is below one half the holdup voltage. Consequently, the voltage across the complementary switch is below 400 Vdc and the diodes 122, 124 are cut off. Current ratings of the switches 121, 123 and the diodes 122, 124 can be reduced by setting a higher holdup voltage.

FIG. 13 is the basic embodiment of a resonant forward/flyback SPS. The SPS converts a DC input voltage of a conventional voltage source into a DC output voltage. An inductive means 135 attains a current. A first switching means 131 selectively applies the input voltage to the inductive means. A transformer means 130 provides primary and secondary voltages in response to the current. A second switching means 133 selectively applies the primary voltage to the inductive means. A first capacitive means 136 stores the primary voltage. A rectifying means 137, 138 rectifies the secondary voltage. A second capacitive means 139 is coupled to the rectifying means for providing the DC output voltage.

Specifically, the input voltage is applied to the drain of the switch 131. One end of the inductor 135 is connected to the source of the switch 131 and the cathode of the switch 133, a thyristor. The other end is connected to the capacitor 136 and the primary winding of the forward transformer 130. The current that the inductor 135 attains is unidirectional. The anode of the thyristor 133, the capacitor 136 and the primary winding are grounded. The diodes 137 and 138 have the anodes connected across the secondary winding, and the cathodes tied together. The diodes 137 and 138 rectify the secondary voltage. The output capacitor 139 is connected between the cathodes of these diodes and the secondary tap for providing the DC output voltage of the SPS.

The switch 131 is in series with the input source. The switches 131 and 133 are activated simultaneously. However, the switch 133 remains open since the input voltage is applied thereacross. The input voltage is positive and so the switch 133 is reverse polarized. When the switch 131 turns off, the inductor 135 enforces negative voltage across the switch 133 causing it to take over the inductor current. The switch 133 turns off automatically when the inductor current drops below a thyristor holding current. This current is substantially equal to zero. Therefore, the switch 133 turns on and off at zero current. The preferred ground reference is at the source of the switch 131, as shown in FIG. 14. However, the instant SPS conveys voltage and current polarities that are intuitive.

The inductor 135 is effectively coupled in series or in parallel with the primary winding when the switch 131 is turned on or off respectively. The inductor 135 acts like a large leakage inductance of the transformer 130 and limits the primary current. The capacitor 136 is employed to accomplish the resonant operation of the SPS. The capacitor 136 is in parallel with the primary winding. By these means, rise and fall times of the primary and secondary voltages are limited by the capacitor 136 rather than stray capacitances. Uncontrollable oscillations and spikes are prevented. Moreover, the output diodes 137 and 138 operate more efficiently as voltages and currents applied thereto have reduced slew rates. Output snubbers, usually coupled in parallel with diodes 137 and 138, are unnecessary. Synchronous rectifiers can be substituted for diodes 137 and 138 to further increase the efficiency. No output inductor is used.

Reflected forward and flyback voltages have uneven amplitudes. The diodes 137 and 138 carry out full rectification of the secondary voltage. However, the secondary tap is not centered. Specifically, when the diode 138 conducts, the secondary voltage is approximately equal to a sum of the forward voltage of the diode 138 and the output voltage of the SPS. The primary voltage is positive and equal to the reflected forward voltage. Similarly, when the diode 137 conducts, the primary voltage is negative and equal to the reflected flyback voltage. The primary voltage is thus limited to both reflected voltages. Each reflected voltage is approximately equal to the peak secondary voltage multiplied by the respective turns ratio. Therefore, the portions of the secondary winding connected to the diodes 138 and 137 define the reflected forward and flyback voltages respectively. Actual reflected voltages vary even if the output voltage is well regulated. In particular, the forward voltages of the diodes 137 and 138 depend on the output current of the SPS. For the purpose of simplicity, it is assumed that both reflected voltages are invariable.

Four phases of operation can be distinguished. During a forward phase, the SPS operates in a forward mode. Energy is delivered to the transformer 130 and transferred to the capacitor 139. The primary voltage is equal to the reflected forward voltage. During a forward-to-flyback transition phase, the primary voltage is below the reflected forward voltage but above the reflected flyback voltage. Consequently, no energy is delivered to the capacitor 139. During a flyback phase, the SPS operates in the flyback mode. Energy stored in the transformer 130 is delivered to the capacitor 139. The primary voltage is equal to the reflected flyback voltage. Finally, during a flyback-to-forward transition phase, the primary voltage is above the reflected flyback voltage but below the reflected forward voltage. Again, no energy is delivered to the capacitor 139. The latter transition phase can be extended indefinitely. This allows implementation of alternative switching schemes.

The SPS can operate in a discontinuous or continuous mode in accordance with the inductor current. Preferably, the SPS operates in the discontinuous mode but can reach the continuous mode occasionally. In the discontinuous mode, the current of the inductor 135 drops to zero during the forward-to-flyback transition phase. Therefore, the inductor 135 can deliver energy to the transformer 130 during at least a portion of each switching phase. Moreover, transformer reset is accomplished. In particular, the inductor current and the primary voltage can reach zero simultaneously. The operation in the discontinuous mode may be caused by abnormal operating conditions, such as short circuit at the output of the SPS. The inductor current remains greater than zero. Nevertheless, the transformer 130 can be reset if the inductor current falls below a threshold at zero crossing of the primary voltage during the forward-to-flyback transition phase.

The switching cycle can commence at any time, when the switch 131 turns on. The switch 131 is effectively coupled in series with the inductor 135 and thus turns on at zero current in the discontinuous mode. For example, the switching cycle can start by the end of the flyback phase. This results in an operation at increased switching frequency. The transformer 130 is first reset at the end of the flyback phase. The capacitor 136 is charged to the reflected flyback voltage. If the start of the switching cycle is delayed, energy stored in the capacitor 136 is delivered to the transformer 130. That energy transfer is completed when the primary voltage is zero. The transformer 130 is reset again before the capacitor 136 is fully recharged. However, single transformer reset can be also accomplished. If the start of the switching cycle is further delayed, the primary voltage can reach level of the reflected flyback voltage but have positive polarity. A voltage appearing across the switch 131 is minimal. Therefore, switching losses are reduced if the switching cycle starts at that moment. If no action is taken, the primary voltage oscillates, wherein no energy is delivered to the capacitor 139.

In the following example, the switch 131 turns on at the end of the flyback phase. The switch 133 is activated simultaneously. The capacitor 136 is charged to the reflected flyback voltage that is negative. Therefore, the highest possible voltage is applied across the inductor 135 and the inductor current increases at the maximum rate. The transformer 130 is initially reset. The increasing inductor current is applied to the capacitor 136 and the primary winding of the transformer 130. However, the primary current flows in the opposite direction since the primary voltage is negative. The capacitor voltage is equal thereto. Therefore, the transformer 130 is reset again shortly after zero crossing of the primary voltage. The flyback-to-forward transition phase ends when the primary voltage reaches the reflected forward voltage.

During the flyback-to-forward transition phase, the primary current is equal to the magnetizing current. The primary voltage $V_P$, the inductor current $i_D$ and the magnetizing current $i_M$ are expressed by the following equations [1]:

$$V_P = \frac{L_M}{L_D + L_M} V - \left(\frac{L_M}{L_D + L_M} V - E_B\right)\cos\omega t$$

$$i_D = \frac{V}{L_D + L_M} t + \left(\frac{L_M}{L_D + L_M} V - E_B\right)\frac{\sin\omega t}{\omega L_D}$$

$$i_M = \frac{V}{L_D + L_M} t - \left(\frac{L_M}{L_D + L_M} V - E_B\right)\frac{\sin\omega t}{\omega L_M}$$

where $$\omega = \frac{1}{\sqrt{LC}}$$

$$L = \frac{L_D L_M}{L_D + L_M}$$

V and $E_B$ are the input voltage and the reflected flyback voltage respectively. $L_D$ and $L_M$ are values of the inductor 135 and the magnetizing inductance respectively. C is the value of the capacitor 136. The equations confirm that at time t=0, both currents are zero. Furthermore, the primary voltage is equal to $E_B$ that is negative.

The forward phase begins when the primary voltage reaches the reflected forward voltage. The switch 131 remains closed. Moreover, the diode 138 starts to conduct the secondary current. The reflected current is equal to the secondary current divided by the respective turns ratio of the transformer 130. The primary current is equal to a sum of the magnetizing current and the reflected current. The inductor current is equal to the primary current, wherein no current flows through the capacitor 136.

The forward phase begins at time $t_0$ from the beginning of the switching cycle. However, it is convenient to consider t=0 the beginning of the phase. Since the primary voltage is fixed, the inductor and primary currents continue to increase at fixed rates. The reflected current $i_R$ is a difference between the inductor current and the magnetizing current. The currents assume the following relationships [2]:

$$i_D = \frac{V - E_F}{L_D} t + i_D(t_0)$$

$$i_M = \frac{E_F}{L_M} t + i_M(t_0)$$

$$i_R = \left(\frac{V}{L_D} - \frac{E_F}{L}\right) t + i_D(t_0) - i_M(t_0)$$

where $E_F$ is the reflected forward voltage. $i_D(t_0)$ and $i_M(t_0)$ are the inductor and magnetizing currents at the beginning of the forward phase respectively. Therefore, these currents are determined at time to from the beginning of the switching cycle.

The switches 131 and 133 are activated simultaneously. However, the switch 131 enforces the reverse voltage across the switch 133 and prevents conduction thereof. As a result, the switch 133 turns on at zero voltage and zero current. The switch 131 turns off during the forward phase when the inductor current reaches a desired level. This is also the peak value $i_{Dmax}$ of the inductor current within the present switching cycle. The switch 133 takes over the inductor current automatically. Subsequently, a gate current of the switch 133 is discontinued. However, the switch 133 remains closed until the inductor current drops to zero. The inductor 135 is effectively coupled in parallel with the capacitor 136 and the primary winding. Moreover, the inductor current starts to fall, whereas the magnetizing current continues to rise. The primary voltage is still limited to the reflected forward voltage.

The switch 131 turns off at time $t_1$ from the beginning of the forward phase. It is convenient to consider t=0 the time of that event. The currents assume the following relationships [3]:

$$i_D = -\frac{E_F}{L_D} t + i_{Dmax}$$

$$i_M = \frac{E_F}{L_M} t + i_M(t_1)$$

$$i_R = -\frac{E_F}{L} t + i_{Dmax} - i_M(t_1)$$

where $i_M(t_1)$ is the magnetizing current at time $t_0+t_1$ from the beginning of the switching cycle.

The falling inductor current and the rising magnetizing current reach the same level J at the beginning of the forward-to-flyback transition phase. J is thus the initial inductor and magnetizing current of that phase. J depends on $i_{Dmax}$ that is the peak inductor current and the peak conduction current of the switches 131 and 133. Preferably, $i_{Dmax}$ is determined by sensing the drain current of the switch 131. The equations [2] and [3] yield the following relationships [4]:

$$i_D(t_1) = i_{Dmax} = \frac{V - E_F}{L_D} t_1 + i_D(t_0)$$

$$i_D(t_2) = J = -\frac{E_F}{L_D} t_2 + i_{Dmax}$$

$$i_M(t_2) = J = \frac{E_F}{L_M}(t_1 + t_2) + i_M(t_0)$$

Therefore, the forward-to-flyback transition phase begins when the reflected current drops to zero. The switch 133 continues to conduct the inductor current. Moreover, both diodes 137 and 138 are cut off. The phase begins at time $t_1+t_2$ from the beginning of the forward phase, i.e. at time $t_0+t_1+t_2$ from the beginning of the switching cycle. It is convenient to consider t=0 the beginning of the forward-to-flyback transition phase. The primary voltage, the inductor current and the magnetizing current are expressed by the following equations [5]:

$$V_P = E_F \cos\omega t$$

$$i_D = -\frac{E_F}{\omega L_D}\sin\omega t + J$$

$$i_M = \frac{E_F}{\omega L_M}\sin\omega t + J$$

The discontinuous mode is characterized by zero inductor current. The current drops to zero at time $t_3$ from the beginning of the forward-to-flyback transition phase. The equations [5] yield conditions at $t=t_3$ as expressed by the following equations [6]:

$$V_P(t_3) = \sqrt{E_F^2 - (\omega L_D J)^2}$$

$$J \leq \frac{E_F}{\omega L_D}$$

$$i_M(t_3) = \frac{L_D + L_M}{L_M} J$$

where $V_P(t_3)$ and $i_M(t_3)$ are the primary voltage and the magnetizing current at $t=t_3$ respectively. Therefore, the conditions apply at time $t_0+t_1+t_2+t_3$ from the beginning of the switching cycle. J must not exceed a predetermined value. However, that value is fixed since the SPS provides the fixed output voltage. The switch 133 turns off when the inductor current drops to zero. However, if that current is greater than zero at zero crossing of the primary voltage, the switch 133 remains closed. The inductor current starts to build up again, wherein the SPS operates in the continuous mode. This may be caused by abnormal operating conditions such as short circuit at the output of the SPS.

The forward-to-flyback transition phase continues with both switches 131 and 133 turned off. The voltage across the inductor 135 is zero. Therefore, the voltage across the switch 131 is equal to a difference between the input voltage and the primary voltage. The latter voltage appears across the switch 133 that is again reverse polarized. The magnetizing current and the primary voltage are expressed by the following equations [7]:

$$V_P = V_P(t_3)\cos\omega_M t - \omega_M L_M i_M(t_3)\sin\omega_M t$$

$$i_M = \frac{V_P(t_3)}{\omega_M L_M}\sin\omega_M t + \frac{L_D\cos\omega_M t + L_M}{L_D + L_M} i_M(t_3)$$

$$\omega_M = \frac{1}{\sqrt{L_M C}}$$

At the beginning of the forward-to-flyback transition phase, the resonant circuit consists of the inductor 135, the magnetizing inductance and the capacitor 136. All these components store energy. However, the inductor 135 and the primary winding are effectively coupled in parallel. They also carry the same current J in opposite directions, wherein the reflected current is zero. This is equivalent to a single inductor that is discharged. Therefore, effective energy of the resonant circuit is stored in the capacitor 136 only. Furthermore, the inductor 135 and the capacitor 136 are discharged at zero crossing of the primary voltage. Entire energy is stored in the magnetizing inductance. Energy at the beginning of the phase is equal to energy at zero crossing. This yields the magnetizing current $i_M(t_4)$ at zero crossing. The following applies [8]:

$$\frac{CE_F^2}{2} = \frac{L_M i_M^2(t_4)}{2}$$

$$i_M(t_4) = \frac{E_F}{\omega_M L_M}$$

The forward-to-flyback transition phase continues for the interval $t_5$. The switches 131 and 133 remain open and the inductor 135 is still discharged. Magnetizing energy continues to recharge the capacitor 136, wherein the primary voltage becomes negative. It is convenient to consider $t=0$ the time of zero crossing. The equations [7] and [8] yield the primary voltage and the magnetizing current, as follows [9]:

$$V_P = -E_F \sin\omega_M t$$

$$i_M = \frac{L_D\cos\omega_M t + L_M}{L_D + L_M} \frac{E_F}{\omega_M L_M}$$

The flyback phase begins when the primary voltage reaches the reflected flyback voltage. Both switches 131 and 133 remain open, whereas the diode 137 conducts the secondary current. Energy stored in the transformer 130 is delivered to the capacitor 139. Accordingly, the reflected current is equal to the magnetizing current, whereas the primary current is zero. The flyback phase begins at time $t_3+t_4+t_5$ from the beginning of the forward-to-flyback transition phase, i.e. at time $t_0+t_1+t_2+t_3+t_4+t_5$ from the start of the switching cycle. It is convenient to consider $t=0$ the beginning of the flyback phase. Since the primary voltage is fixed, the magnetizing current falls at a fixed rate. The equations [9] yield the initial magnetizing current $i_M(t_5)$ at the beginning of the flyback phase. At the end of the flyback phase, the secondary current is zero and there is no energy stored in the transformer 130. The flyback phase is governed by the following equations [10]:

$$i_M(t_5) = \frac{L_D\sqrt{E_F^2 - E_B^2} + L_M E_F}{L_D + L_M} \frac{1}{\omega_M L_M}$$

$$i_R = i_M = \frac{E_B}{L_M} t + i_M(t_5)$$

The switching cycle starts at the beginning of the flyback-to-forward transition phase. The inductor and magnetizing currents are then zero. At the beginning of the forward phase and the forward-to-flyback transition phase, the inductor current is $i_D(t_0)$ and J respectively. The inductor current drops to zero during the forward-to-flyback transition phase. It remains zero until the end of the switching cycle. At the beginning of the forward phase, forward-to-flyback transition phase and flyback phase, the magnetizing current is $i_M(t_0)$, J and $i_M(t_5)$ respectively. The magnetizing current reaches zero twice during the flyback-to-forward transition phase: once before and once after zero crossing of the primary voltage. The following table more clearly sets forth the operation of the SPS.

| Phase | Start Time | Length | Initial Inductor Current | Initial Magnetizing Current |
|---|---|---|---|---|
| Flyback-to-Forward | 0 | $t_0$ | 0 | 0 |
| Forward | $t_0$ | $t_1 + t_2$ | $i_D(t_0)$ | $i_M(t_0)$ |
| Forward-to-Flyback | $t_0 + t_1 + t_2$ | $t_3 + t_4 + t_5$ | J | J |
| Flyback | $t_0 + t_1 + t_2 + t_3 + t_4 + t_5$ | $t_6$ | 0 | $i_M(t_5)$ |

The initial inductor and magnetizing currents, $i_D(t_0)$ and $i_M(t_0)$ respectively, can be neglected. They build up during the flyback-to-forward transition phase that is the shortest switching phase. The equations [4] and [6] yield the relations of J, $i_{Dmax}$ and the length of the forward phase $t_1+t_2$. The equations [4] and [10] yield the turn-on time $t_1$ of the switch 131 during the forward phase and the length of the flyback phase $t_6$ respectively:

$$J \approx \frac{L_D}{L_D + L_M} \frac{V}{V - E_F} i_{D\max}$$

$$i_{D\max} < \frac{L_D + L_M}{L_D} \frac{V - E_F}{V} \frac{E_F}{\omega L_D}$$

$$t_1 \approx \frac{L_D}{V - E_F} i_{D\max}$$

$$t_1 + t_2 \approx \frac{L_M J}{E_F} < \frac{L_M}{\omega L_D}$$

$$t_6 = -\frac{L_D \sqrt{E_F^2 - E_B^2} + L_M E_F}{\omega_M (L_D + L_M) E_B}$$

$i_{Dmax}$ is limited to a current that is inversely proportional to negative value of the input voltage V. The other parameters are fixed. Therefore, a peak value of $i_{Dmax}$ is determined by the lowest input voltage applied to the SPS, e.g. amplitude of a low line voltage. The peak secondary current is proportional to $i_{Dmax}$ that determines the output power supplied to the load. By contrast, the peak secondary current supplied during the flyback phase is proportional to $i_M(t_5)$ that is constant. This is shown in the equations [10].

The switching frequency is determined by the total length of all four phases. The flyback-to-forward and forward-to-flyback transition phases are significantly shorter than the forward and flyback phases. The length of each transition phase can be neglected or considered constant. The length of the forward phase depends on $i_{Dmax}$ and V, whereas the length of the flyback phase is constant. The result is the switching frequency that has a fixed turn-off time. Furthermore, the switching frequency decreases with increasing peak of the inductor current. This is very advantageous since the switching frequency is lowest when the SPS delivers a peak power. Duty cycles at which the switches 131 and 133 operate differ from the duty cycle of the switching frequency. In particular, the desired level $i_{Dmax}$. Subsequently, the switch 133 takes over the inductor current. Both events occur while the SPS continues to operate in the forward phase. On-times of the switches 131 and 133 are determined by the intervals $t_1$ and $t_2$ respectively, and depend on $i_{Dmax}$. By contrast, the duty cycle of the switching frequency is determined by the occurrences of the transition phases.

Other switching schemes can be used to accomplish specific advantages. For example, a higher switching frequency can be achieved simply by reducing the length of the flyback phase. The switch 131 can turn on during the flyback phase, before the magnetizing current drops to zero. Moreover, single transformer reset can be accomplished. A small output inductor allows an efficient implementation of other switching schemes, particularly PWM. The output inductor can be coupled in series with the capacitor 139, as the inductor 15 of FIG. 1. Preferably, the output inductor is coupled in series with the diode 137 to more effectively target the flyback-to-forward transition phase. This is pointed out hereinafter.

FIG. 14 is the preferred embodiment of a resonant flyback, forward or forward/flyback SPS. The SPS is based on the FIG. 13 embodiment. The components 140, 141 and 145 through 149 are connected as the components 130, 131 and 135 through 139 of the FIG. 13 embodiment respectively. However, the input voltage is not referenced to ground. The ground reference is relocated so that the switches 141 and 143 are grounded. The drain of the switch 141 is connected to a positive terminal of the input source. The anode of the diode 144, the capacitor 146 and the primary winding of the transformer 140 are connected to a negative terminal of the input source. The switch 143 and the diode 144 are substituted for the thyristor 133 of FIG. 13. The drain of the switch 143 is connected to the cathode of the diode 144. Therefore, the diode 144 prevents a reverse drain current of the switch 143. The sources of the switches 141 and 143 are grounded. This is convenient to driving the gates of the switches. Furthermore, the sources of both switches can be connected to ground via a resistor for sensing the input and inductor currents.

The primary winding and the capacitor 146 are connected to ground through the inductor 145. The order of this series connection can be reversed. However, the instant topology results in reduced EMI/RFI since the primary winding is connected to the input source. The diode 147 and the respective portion of the secondary winding are optional as marked in the drawing. The diode 147 and a tap of the secondary winding are omitted in the flyback and forward versions of the SPS. Therefore, polarity of the primary winding is unmarked in the drawing. It is set in accordance with the version, as shown in FIGS. 6, 7 and 13. The inductor 445 is also optional as marked in the drawing. It can be coupled in series with the diode 148 or with the capacitor 149. In the latter case, the inductor 445 corresponds to the inductor 15 of FIG. 1.

The switches 141 and 143 are activated simultaneously. When the switch 141 is turned on, the diode 144 is reverse biased. The inductor 145 is effectively coupled in series with the input source. The switch 141 turns off when the inductor current reaches a desired level. This is also the peak value $i_{Dmax}$ of the inductor current within one switching cycle. The switch 143 and the diode 144 automatically take over the inductor current. The inductor 145 is effectively coupled in parallel with the capacitor 146 and the primary winding. The switch 141 turns on at zero current if the SPS operates in the discontinuous mode. By contrast, the switch 143 turns off only when the inductor current drops to zero during the respective transition phase. Therefore, the switch 143 remains closed if the SPS operates in the continuous mode. The switch 143 turns on at zero voltage and zero current, and off at zero current.

Current ratings of the switches 141, 143 and the diode 144 are determined by $i_{Dmax}$. By way of example, voltage ratings of the components 141, 143 and 144 in the forward/flyback SPS are considered. Peak voltage of the switch 141 is determined by a sum of the peak input voltage and the reflected flyback voltage. Peak voltages of the switch 143 and the diode 144 are determined by the reflected flyback voltage and the peak input voltage respectively. The peak input voltage is greater than the reflected forward voltage. Furthermore, the latter voltage is greater than inverted value of the reflected flyback voltage. For example, the universal line voltage of 85 Vac to 265 Vac may be rectified and filtered for the conversion. The input voltage applied to the SPS can thus vary from 120 Vdc to 374 Vdc. The reflected forward and flyback voltages may be set to 100 Vdc and −60 Vdc respectively. Peak voltage of the switch 141 is 434 Vdc. This is merely 60 Vdc higher than the line voltage peak of 374 Vdc. Peak voltages of the switch 143 and the diode 144 are only 60 Vdc and 374 Vdc respectively.

In order to assure safe operation, the drain current of the switch 141 is sensed and limited to $i_{Dmax}$. The drain current is taken over by the switch 143 and the diode 144. The current applied to the capacitor 146 and the primary winding is equal to the inductor current. The latter current is unidirectional and inherently uninterrupted. Moreover, the capacitor 146 integrates the primary voltage. Preferably, the voltage at the negative terminal of the input source is sensed as well. The instance at which the inductor 145 drops to zero can be determined with great accuracy. The switch 143 turns off in a transition phase when the voltage at the negative terminal of the input source becomes negative with reference to ground. The inductor current is then zero and remains zero until the next switching cycle.

In the forward version of the SPS, energy is transferred to the capacitor 149 only during the forward phase. A transition phase separates consecutive forward phases. Furthermore, the SPS can operate in the discontinuous or continuous mode. In the former case, the current of the inductor 145 drops to zero. In the latter case, the switch 143 remains closed throughout the switching cycle and provides a path for the inductor current. An analysis of the forward SPS operating in the discontinuous mode will be conducted. This is particularly easy when switching conditions correspond to those assumed in the previous example. Equations governing the operation of the SPS derive from the equations pertaining to the forward/flyback SPS of FIG. 13.

The switch 141 turns on when the transformer 140 is first reset in the transition phase. The switch 141 turns off when the inductor current reaches the desired level $i_{Dmax}$ in the forward phase. Subsequently, the switch 143 and the diode 144 take over the inductor current. The switch 143 turns off when the inductor current drops to zero during the transition phase. Therefore, the switch 141 turns on at zero current. The switch 143 turns on at zero voltage and zero current, and turns off at zero current. The equations [9] describe the operation of the SPS during the transition phase starting at zero crossing of the primary voltage. In particular, the equations [9] set conditions for transformer reset. The second equation shows that the reset occurs only if the value of the inductor 145 is greater than or equal to the value of the magnetizing inductance. If that is the case, the first equation defines the primary voltage at which the transformer 140 is reset.

Similar remarks apply to the flyback version of the SPS. Energy is transferred only during the flyback phase, each alternating with a transition phase. The SPS can operate in the discontinuous or continuous mode. The discontinuous operation will be considered in detail under conditions comparable to the previous examples. The switch 141 turns on when the transformer 140 is first reset at the end of the flyback phase. The equations [1] describe the operation of the SPS during the transition phase with the switch 141 closed. The switch 141 turns off at time $t_{01}$ that corresponds to time $t_0 + t_1$ in the example of the FIG. 13 SPS. However, the transition phase continues. The equations [1] yield $t_{01}$ and a difference between the inductor and magnetizing currents at $t_{01}$:

$$\cos\omega t_{01} < \frac{1}{1 - \frac{L_D + L_M}{L_M} \frac{E_B}{V}}$$

$$\Delta i = i_{Dmax} - i_M(t_{01}) = \left(\frac{L_M}{L_D + L_M} V - E_B\right) \frac{\sin\omega t_{01}}{\omega L}$$

The primary voltage increases from the reflected flyback voltage $E_B$ to a voltage having opposite polarity. In particular, the inductor current is greater than the magnetizing current if $t_{01}$ is smaller than one half period of the resonant frequency. The switch 141 turns off when the inductor current reaches the desired level $i_{Dmax}$ in the transition phase. The level of the primary voltage is then $V_P(t_{01})$. Subsequently, the switch 143 and the diode 144 take over the inductor current. The inductor 145 and the magnetizing inductance are coupled in parallel and act like a single inductor carrying the current $i_D - i_M$. The following equations define the primary voltage and that differential current until the inductor current drops to zero:

$$V_P = V_P(t_{01})\cos\omega t + \omega L \Delta i \sin\omega t$$

$$i_D - i_M = -V_P(t_{01})\frac{\sin\omega t}{\omega L} + \Delta i \cos\omega t$$

The last equations provide an expanded version of the equations [5]. Specifically, the equations [5] apply when the increasing magnetizing current and the decreasing inductor current reach the same current level J at the corresponding primary voltage $E_F$. The remaining equations [6] through [10] define the operation of the SPS when the inductor current reaches zero, and thereafter. The flyback phase starts when the primary voltage reaches the reflected flyback voltage.

Other switching schemes can be used to accomplish specific advantages. For example, the optional output inductor 445 allows an efficient implementation of PWM. However, an increased value of the inductor 445 has undesirable consequences. In particular, peak voltages of the switches 141 and/or 143 may become excessive. The forward/flyback SPS is simply inoperative due to short circuit condition. In the flyback and forward versions, a portion of energy stored in the inductor 445 is returned to the transformer 140. On the contrary, a large value of an equivalent output inductor is highly desirable in conventional off-line SPSs of forward type. A continuous current flowing to an output capacitor is enforced in spite of significant drawbacks.

For example, a second output diode is used to maintain the continuous current in the conventional SPSs with a single switch. An equivalent diode 77 is shown in FIG. 7. However, this diode diminishes efficiency. The result is particularly dramatic when a forward voltage of the diode and the output voltage of the SPS are of the same order of magnitude. In the instant SPS, an equivalent diode is non-existent. In the conventional SPSs with complementary switches, a full output rectification is performed. Equivalent diodes 87 and 88 are shown in FIG. 8. When the switches are in off state, that may be significantly longer than a dead time, the output inductor causes short circuit condition. The secondary winding of the transformer is shorted so that energy stored therein is trapped and partly wasted. In the instant SPS, this condition is completely avoidable even if PWM is used.

The inductor 445 having a relatively small value is adequate. The inductor 445 is used merely for draining residue energy stored in the transformer 140 and the capacitor 146. This is equivalent to substantially depleting energy stored in the transformer 140. Preferably, the inductor 445 is coupled in series with the diode 147 of the forward/flyback SPS. Therefore, energy is drained only during the flyback phase. The inductor 445 extends the range of actual reflected flyback voltage. In particular, the secondary current continues to flow even when the rectified secondary voltage is below the output voltage. Any oscillations are severely suppressed. However, the diode 147 continues to clamp the primary voltage so that the resonant operation is limited to both transition phases. The inductor 445 can be also coupled in series with the capacitor 149, as the inductor 15 of FIG. 1. Therefore, the flyback, forward and forward/flyback SPSs each can employ the inductor 445. Finally, an additional output inductor can be used to fine-tune the SPS. That inductor can be connected in series with the diode 148 or the capacitor 149.

FIG. 15 is the preferred embodiment of one- or two-switch resonant flyback, forward or forward/flyback converter implementing power factor correction. The converter is supplied from the B- or X-type front-end, wherein the X-type front-end with the switch 31 is preferred. The switch 153, a thyristor, is optional as marked in the drawing. The input voltage at the terminal B/X is applied through the inductor 155 to the anode of the switch 153, the capacitor 156 and the primary winding of the transformer 150. The primary winding is further tied to the drain of the switch 151, the cathode of the switch 153, the anode of the diode 152 and the capacitor 156. Therefore, the switch 153 and the capacitor 156 are connected in parallel across the primary winding. The cathode of the diode 152 is connected to the output terminal C so that peak voltage of the switch 151 is clamped to the holdup voltage. The source of the switch 151 is grounded. The components 157 through 159 of the secondary circuit are connected as the components 147 through 149 of the FIG. 14 embodiment respectively. Accordingly, the diode 157 and the respective portion of the secondary winding are optional. The flyback and forward versions of the SPS require no secondary tap, wherein the single output diode 158 is used. Therefore, polarity of the primary winding is unmarked in the drawing. It is set in accordance with the version, as shown in FIGS. 6, 7 and 13.

Four switching phases can be distinguished in the operation of the forward/flyback version of the converter. The flyback and forward versions of the converter operate in two switching phases. In the forward phase of the forward and forward/flyback converters, the primary voltage is equal to the reflected forward voltage. In the flyback phase of the flyback and forward/flyback converters, the primary voltage is equal to the reflected flyback voltage. A transition phase follows each forward and/or flyback phase. The switching cycle begins when the switch 151 turns on, preferably before or at transformer reset. The primary winding and the capacitor 156 form the resonant network. The inductor 155 is in series therewith and attains the input current. This is in accordance with the operation of the SPSs of FIGS. 13 and 14. By contrast, a voltage across the inductor 155 exceeds the primary voltage when the switch 151 is open and the input voltage is below the holdup voltage.

Specifically, when the switch 151 turns off, the input current is uninterrupted. The input current is equal to the inductor current. The diode 152 takes over the inductor current and applies it to the holdup capacitor of the front-end. Therefore, the inductor current continues to flow through the primary winding. The primary voltage possibly remains equal to the reflected forward voltage. Nevertheless, the voltage across the switch 151 is limited to the holdup voltage. The forward phase, if any, ends when the increasing magnetizing current reaches the level of the decreasing inductor current. Therefore, the forward phase is extended if the respective switch of the front-end applies the holdup voltage to the B/X terminal. The inductor 155 is effectively coupled across the capacitor 156 and the primary winding. This is also consistent with the operation of the SPSs of FIGS. 13 and 14. As the transition phase starts or continues, the inductor current drops to zero. The primary voltage changes polarity and possibly reaches the reflected flyback voltage. Moreover, if the input voltage of the front-end is sufficiently high, a sum of that voltage and the primary voltage can reach the holdup voltage. The inductor current starts to build up even before the switch 151 turns on again.

The optional switch 153 is activated in order to increase the input current while preventing energy transfer to the capacitor 159. The primary winding is effectively shorted. A MOSFET in series with a diode is intended to operate as the switch 153. Specifically, the switch 153 is activated when the voltage thereacross is reversed. Therefore, the switch 153 turns on at zero voltage and zero current. When the switch 151 is turned on, both switches 151 and 153 conduct the input current. The input current increases, whereas the primary voltage is near zero. The switch 151 turns off to terminate that increase. The switch 153 turns off automatically when the input current conducted by the switch 153 drops below a thyristor holding current. The latter current is near zero.

The switch 153 corresponds the switch 63 of FIG. 6 and 73 of FIG. 7, each shorting the input to ground. However, the switch 153 is connected across the primary winding. This results in a dramatic reduction of voltage ratings of the switch 153 and a significant improvement of switching conditions. Moreover, the converter is operational without the switch 153. Main advantages of this method are utter simplicity and reduced cost of the converter. In order to increase the input current of the converter beyond the desirable primary current, transformer reset is avoided. Therefore, the converter operates in a continuous mode. Moreover, the transformer 150 can be intentionally saturated, as in the converters of FIGS. 6 10 and 7. The operation with the saturated transformer 150 may be more efficient than the continuous mode.

Figure 16:
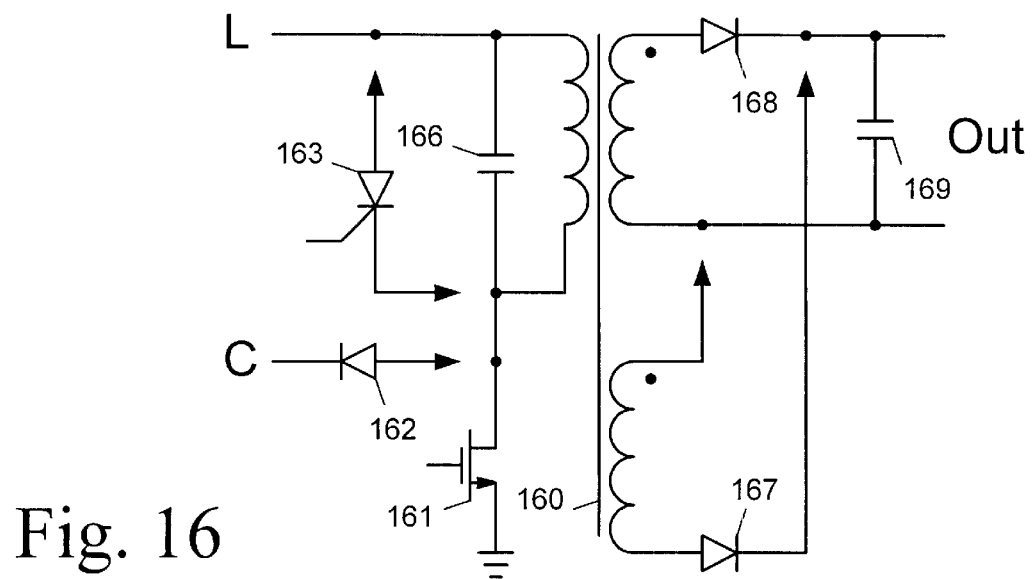
FIG. 16 is the preferred embodiment of one- or two-switch resonant flyback, forward or forward/flyback converter implementing power factor correction.

FIG. 16 is an embodiment of one- or two-switch resonant flyback, forward or forward/flyback converter implementing power factor correction. The converter is supplied from the L-type front-end. The components 160 through 163 and 166 through 169 are connected as the components 150 through 153 and 156 through 159 of the FIG. 15 converter respectively. However, the input voltage at the terminal L is applied directly to the components 160, 163 and 166. The switch 163, a thyristor, and the diode 162 are optional as marked in the drawing. Again, polarity of the primary winding is unmarked in the drawing. It is set in accordance with the version, as shown in FIGS. 6, 7 and 13. The converter operates in the flyback, forward or forward/flyback mode. If the SPS operates in the flyback or forward mode, the diode 167 and the respective portion of the secondary winding are superfluous. This is also marked in the drawing. During the forward phase, energy is delivered to the transformer 160 and transferred to the capacitor 169. During the flyback phase, energy stored in the transformer 160 is delivered to the capacitor 169. A transition phase follows each forward and/or flyback phase.

The switching cycle begins when the switch 161 turns on, preferably before or at transformer reset. The input voltage is applied across the primary winding to start the forward phase, if any. When the switch 161 turns off, the input voltage surges to the holdup voltage. An inductor current that the front-end applies to the terminal L starts to drop. When the primary voltage changes polarity, the operation depends on presence of the diode 162. The diode 162 clamps peak voltage of the switch 161 to the holdup voltage. Therefore, the diode 162 starts to conduct the magnetizing current. In the flyback phase, if any, the primary voltage reaches the reflected flyback voltage. If the inductor current drops below the level of the magnetizing current, the input voltage starts to drop. Moreover, if the input voltage of the front-end is sufficiently high, a sum of that voltage and the primary voltage can reach the holdup voltage. The input current starts to build up even before the switch 161 turns on.

When the primary voltage changes polarity but the diode 162 is unused, the voltage across the switch 161 exceeds the holdup voltage. However, energy stored in the transformer 160 and the capacitor 166 is not fed back to the front-end. The optional switch 163 is activated in order to increase the input current while preventing energy transfer to the capacitor 169. The operation is similar to that of the FIG. 15 converter. In particular, the switch 161 turns on to increase the input current and off to interrupt it. The primary winding is effectively shorted. Without the switch 163, the converter operates in a continuous mode. The transformer 160 can be also intentionally saturated.

Figure 17:
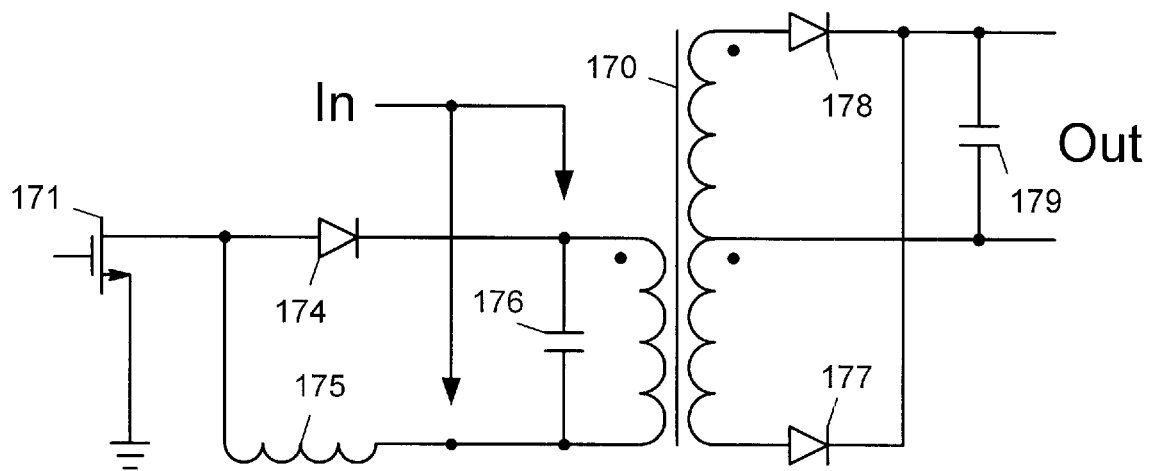
FIG. 17 is an embodiment of one-switch resonant forward/flyback SPS.

FIG. 17 is an embodiment of one-switch resonant forward/flyback SPS. The SPS employs a single switch. Moreover, a peak voltage thereof is limited to the input voltage. The full rectification of the secondary voltage minimizes output voltage ripple and is essential for the operation of the SPS. The input voltage can be applied to either end of the primary winding of the forward transformer 170. This is marked in the drawing. Therefore, the input voltage is applied to the capacitor 176, the primary winding and either the cathode of the diode 174 or the inductor 175. The drain of the switch 171 is connected to the anode of the diode 174 and the inductor 175. The inductor 175, the capacitor 176 and the primary winding are also tied together. The capacitor 176 stores the primary voltage and reduces rates at which that voltage and the secondary voltage change. The source of the switch 171 is grounded. The components 177 through 179 are connected as the components 137 through 139 of the FIG. 13 SPS respectively. Four switching phases can be distinguished as in the operation of the FIG. 13 SPS.

If the input voltage is applied to the components 170, 174 and 176, a voltage across the switch 171 is limited to the input voltage. When the switch 171 turns on, the diode 174 is reverse biased. The input voltage reduced by the primary voltage is applied across the inductor 175 that is effectively grounded. The transformer 170 is reset before or at zero crossing of the primary voltage during the flyback-to-forward transition phase. For example, the switch 171 can turn on at zero crossing of that phase. The diode 178 starts to conduct at the beginning of the forward phase. Subsequently, the switch 171 turns off when the inductor current reaches a desired level. The inductor current drops to zero during the following forward-to-flyback transition phase. However, the diode 174 starts to conduct the inductor current immediately after the zero crossing. The diode 177 starts to conduct at the beginning of the flyback phase, wherein the inductor current continues to increase. At the end of the flyback phase, the inductor and magnetizing currents depend on the value of the inductor 175, the magnetizing inductance and both reflected voltages. Therefore, equations governing transformer reset are more complex than the equations [6] defining inductor reset of the FIG. 13 SPS.

If the input voltage is applied to the components 170, 175 and 176, the SPS is more efficient. Energy fed back from the forward transformer 170 and the capacitor 176 to the inductor 175 is reduced. However, voltage ratings of the switch 171 and the diode 174 are increased by the reflected forward voltage. When the switch 171 turns on, the diode 174 is reverse biased. The input voltage is applied across the inductor 175. Preferably, the switch 171 turns on near the end of the flyback phase and turns off at zero crossing during the flyback-to-forward transition phase. Therefore, the switch 171 turns on at a reduced voltage thereacross. Moreover, the inductor current already peaks when transformer reset occurs. The diode 178 starts to conduct at the beginning of the forward phase. The switch 171 is turned off while the inductor 175 delivers energy to the transformer 170. The inductor current drops to zero during the following forward-to-flyback transition phase. However, the diode 174 starts to conduct the inductor current immediately after the zero crossing of the primary voltage. The diode 177 starts to conduct at the beginning of the flyback phase, wherein the inductor current continues to increase. Energy stored in the transformer 170 is delivered to the capacitor 179 and fed back to the inductor 175.

Figure 18:
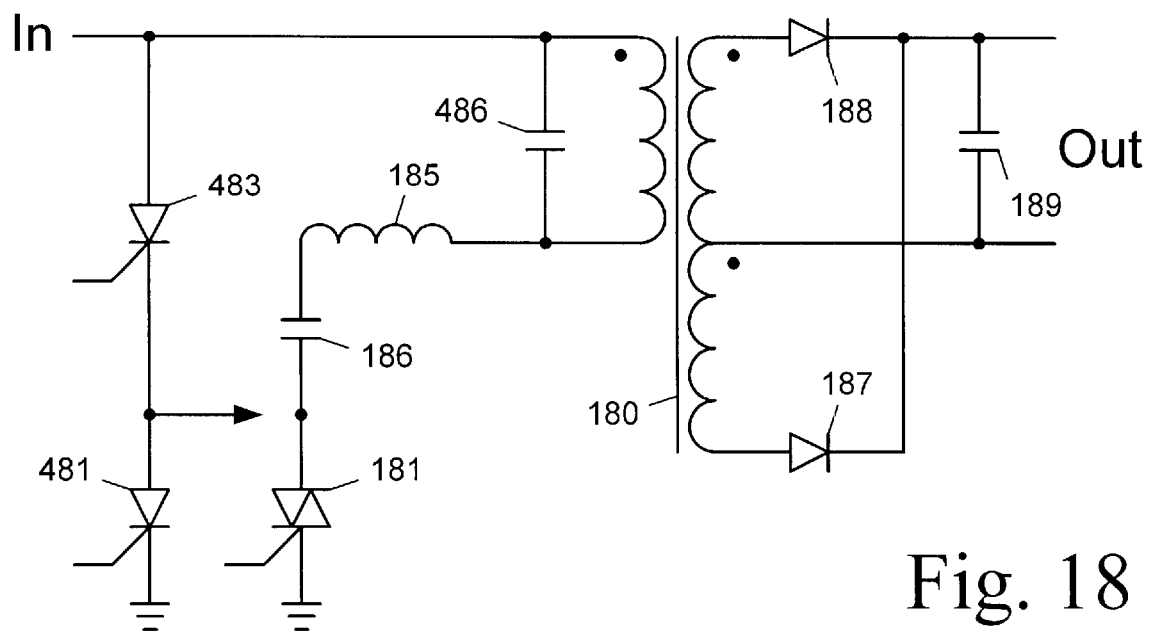
FIG. 18 is an embodiment of a dual-resonance quarter- or half-bridge SPS.

FIG. 18 is an embodiment of a dual-resonance quarter- or half-bridge SPS. The SPS resembles a conventional series resonant SPS. The latter SPS employs a pair of switches to accomplish a push-pull operation. Accordingly, the primary current applied to the forward transformer is bi-directional. Moreover, a pair of diodes is required for limiting a voltage across a series-coupled capacitor. The instant quarter-bridge SPS employs only one switch 181. Nevertheless, the push-pull operation is carried out. The primary capacitor 486 is employed, which allows complete maintenance of the voltage across the capacitor 186. This improves efficiency and adds distinctive advantages. The switch 181, a triac, is used in the quarter-bridge version and the switches 481, 483, thyristors, are used in the half-bridge version. This is marked in the drawing.

Specifically, the input voltage is applied to the capacitor 486 and the primary winding of the forward transformer 180. The inductor 185 is tied to the capacitor 486 and the primary winding. The inductor is also in series with the capacitor 186. The MT2 and MT1 of the switch 181 are connected to the capacitor 186 and ground respectively. Alternatively, the supply voltage is also applied to the anode of the switch 483. The capacitor 186 is connected to the anode of the switch 481 and the cathode of the switch 483. The cathode of the switch 481 is grounded. Moreover, the supply voltage can be applied to the switch 483 exclusively and the components 180, 486 can be grounded instead. The components 187 through 189 are connected as the components 137 through 139 of the FIG. 13 embodiment respectively.

The switch 181 turns on when the primary voltage reaches a desired level. The inductor current is zero. The capacitor 186 is effectively grounded, wherein a voltage stored therein is minimal. The inductor 185 and the capacitor 186 form a resonant network that produces the sinusoidal inductor current. The inductor current and a voltage across the capacitor 186 increase. The diodes 188 and 187 limit the primary voltage to first and second reflected voltages respectively. If the inductor current exceeds the magnetizing current, the diode 188 is conductive and the primary voltage is limited to the first reflected voltage. The inductor and magnetizing currents continue to increase until a voltage across the inductor 185 drops to zero. When both currents become even, the inductor 185 and the primary winding act like a voltage divider. The primary voltage drops below the first reflected voltage and the diode 188 ceases the conduction. Subsequently, the primary voltage changes polarity and the diode 187 starts to conduct. The primary voltage is limited to the second reflected voltage. The inductor current charges the capacitor 186 to a highest voltage as it drops to zero.

The switch 181 conducts the inductor current and turns off automatically. Specifically, the switch 181 turns off at a triac holding current that is substantially equal to zero. The switch 181 is bi-directional and thus turns off twice during the switching cycle. Moreover, a pulse of one polarity is used to trigger the switch 181 regardless of voltage polarity thereacross. The switch 181 having high voltage and current ratings is available at relatively low cost. A pair of parallel-coupled thyristors can be used as the switch 181. Other examples of the bi-directional switch are shown in the co-pending application titled "Precision Switching Power Amplifier and Uninterruptible Power System," filed on even date herewith.

The switch 181 turns on again to complete the switching cycle. The SPS operates analogously. In particular, the inductor current starts to build up in the reverse direction. The capacitor voltage is at the peak that is greater than a sum of the input voltage and the second reflected voltage. The latter voltage appears across the primary winding when the inductor current exceeds the magnetizing current. The voltage across the capacitor 186 continues to decrease. The inductor current is at the peak when the voltage across the inductor 185 drops to zero. Furthermore, the primary voltage changes polarity and reaches to the first reflected voltage. The inductor current discharges the capacitor 186 to the lowest voltage as it drops to zero. The switch 181 turns off automatically.

The primary voltage at which the switch 181 first closes and the voltage stored in the capacitor 186 determine a peak current of the inductor 185. The primary winding and the capacitor 486 form another resonant network. The capacitor 486 enforces a smooth transition of the primary voltage. Therefore, the switch 181 can decisively turn on at any desired level of the primary voltage. Similarly, the switch 181 turns on again when the primary voltage reaches another level. This level is chosen so that an average value of the inductor current is near zero over the switching cycle. By these means, the voltage of the capacitor 186 is restored to its initial level after energy is delivered to the capacitor 189 during the forward and flyback phases. If the SPS is intended to be idle for extended time, a small inductor can be added in series with the capacitor 189 to practically eliminate parasitic oscillations.

The switches 481 and 483 can be substituted for the switch 181. This transforms the quarter-bridge SPS into the half-bridge SPS. Similar to the switch 181, the switches 481 and 483 each turn off at a thyristor holding current that is substantially equal to zero. The SPS operates as with the switch 181. In particular, the switch 481 turns when the voltage across the capacitor 186 is minimal and the primary voltage has a desired level. The inductor current charges the capacitor 186 to the peak level as it drops to zero. The primary voltage in succession reaches the first and second reflected voltages. The switch 483 turns on when the voltage across the capacitor 186 is maximal and the primary voltage has a desired level. When the inductor current drops to zero, the voltage of the capacitor 186 is restored to its initial level.

The switch 483 selectively couples the inductor 185 and the capacitor 186 across the primary winding. Therefore, the input current of the SPS is zero when the switch 483 is conductive. This feature is also characteristic of the conventional half-bridge SPS having a single supply voltage. However, this SPS endures reverse input current due to the leakage inductance. The conventional half-bridge SPS employs a series-coupled capacitor that can be eliminated if a second supply voltage is added. By contrast, the capacitor 186 is essential in order to carry out the resonant operation. The primary winding and the capacitor 486 can be also grounded since the capacitor 186 provides for necessary voltage shift. Alternatively, the primary winding and the capacitor 486 can be tied to two additional thyristors. These switches are connected like the switches 481 and 483, i.e. in series across the power supply. The result is the full-bridge topology.

Figure 19:
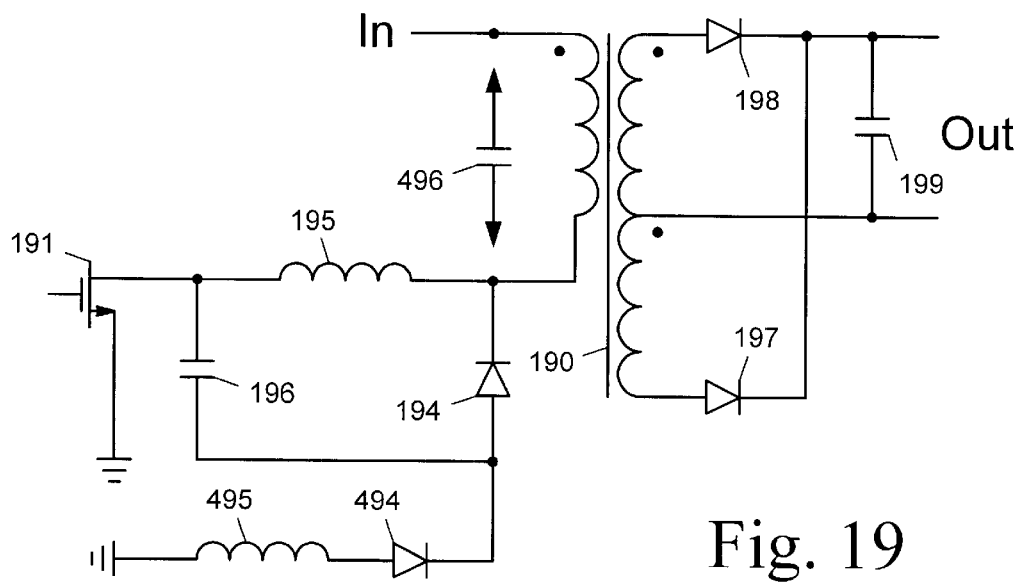
FIG. 19 is the preferred embodiment of a quarter-bridge SPS allowing the resonant operation.

FIG. 19 is the preferred embodiment of a quarter-bridge SPS allowing the resonant operation. The SPS converts an input voltage into a DC output voltage. A first inductive means 195 attains a first current. A second inductive means 495 attains a second current. A third inductive means 190 provides a primary voltage in response to the first and second currents. A first capacitive means 196 stores an intermediate voltage. A switching means 191 selectively applies the first current to the third inductive means 190 and selectively applies the intermediate voltage to the second inductive means 495. A first rectifying means 194, 494 applies the intermediate voltage to the first inductive means and applies the second current to the third inductive means. A second rectifying means 197, 198 limits the primary voltage and provides the DC output voltage. A second capacitive means 199 stores the DC output voltage. In the instant SPS, the third inductive means 190 includes a fourth inductive means for providing a secondary voltage in response to the primary voltage. Therefore, the second rectifying means 197, 198 limits also the secondary voltage.

Specifically, the input voltage is applied to the optional capacitor 496 and the primary winding of the transformer 190. One end of the inductor 195 is tied to the cathode of the diode 194, the capacitor 496 and the primary winding. The other end is tied to the drain of the switch 191 and the capacitor 196. The capacitor 196 is further connected to the anode of the diode 194 and the cathode of the diode 494. The anode of the diode 494 is connected to the inductor 495. The source of the switch 191 and the inductor 495 are grounded. The components 197 through 199 are connected as the components 137 through 139 of the FIG. 13 embodiment respectively.

The SPS can be compared to the half-bridge SPS shown in FIG. 10. The latter SPS can be supplied from a conventional voltage source rather than the front-end. A push-pull operation is accomplished since the primary current applied to the forward transformer is bi-directional. The instant SPS employs the switch 191 and a second inductor instead of a second switch. The inductors 195 and 495 each attain a unidirectional current. Nevertheless, the bi-directional primary current is produced for driving the forward transformer 190. Therefore, the SPS may be referred to as a forward/forward SPS. The capacitor 196 stores a DC voltage that may be also considered another input voltage deriving from a floating source. However, the voltage of the capacitor 196 can change polarity or even oscillate if the switch 191 is closed for too long and the capacitor 196 is too small. A diode, such as 202 of FIG. 20, in parallel with the capacitor 196 can prevent that.

The resonant operation is accomplished by adding the capacitor 496 in parallel with the primary winding as marked in the drawing. In particular, the primary voltage changes at a resonant transition between reflected voltages. If the SPS is intended to be idle for extended time, a small inductor can be added in series with the capacitor 199 to practically eliminate parasitic oscillations. Moreover, the capacitor 496 eliminates voltage spikes caused by the leakage inductance of the transformer 190. Without the capacitor 496, a conventional snubber, transient voltage suppressor or even intra-winding capacitance can be utilized to minimize the voltage spikes. The operation without the capacitor 496 is straightforward and will be considered hereinafter. Furthermore, the quarter-bridge SPS of FIG. 20 has similar topology and carries out the resonant operation.

The switch 191 turns on to enforce energy transfer through the diode 198. The switch 191 conducts a sum of both inductor currents. Therefore, the switch 191 turns on at zero current if both inductor currents are zero. The inductor 195 and the capacitor 196 are effectively grounded. The input voltage reduced by the primary voltage is applied across the inductor 195. Moreover, the DC voltage stored in the capacitor 196 is applied across the inductor 495. The diode 194 is cut off, wherein the primary current is equal to the increasing current of the inductor 195. Furthermore, the increasing current of the inductor 495 flows through the diode 494 and discharges the capacitor 196. The diode 198 conducts the secondary current and limits the primary voltage.

The switch 191 turns off when the primary current reaches a desired level. The capacitor voltage is applied across the inductor 195. Conversely, the input voltage reduced by the primary voltage is applied across the inductor 495. The diode 194 conducts a sum of both inductor currents. The current of the inductor 195 charges the capacitor 196. The diodes 194 and 494 apply the current of the inductor 495 to the primary winding. The primary voltage is reversed. The diode 197 conducts the secondary current and limits the primary voltage. The DC voltage of the capacitor 196 varies within a predetermined range. The inductor currents separately charge and discharge the capacitor 196 when the switch 191 is turned off and on respectively. The average current flowing through the capacitor 196 is adjusted to zero. The transformer 190 operates in the flyback mode to eliminate any flux asymmetry.

Figure 20:
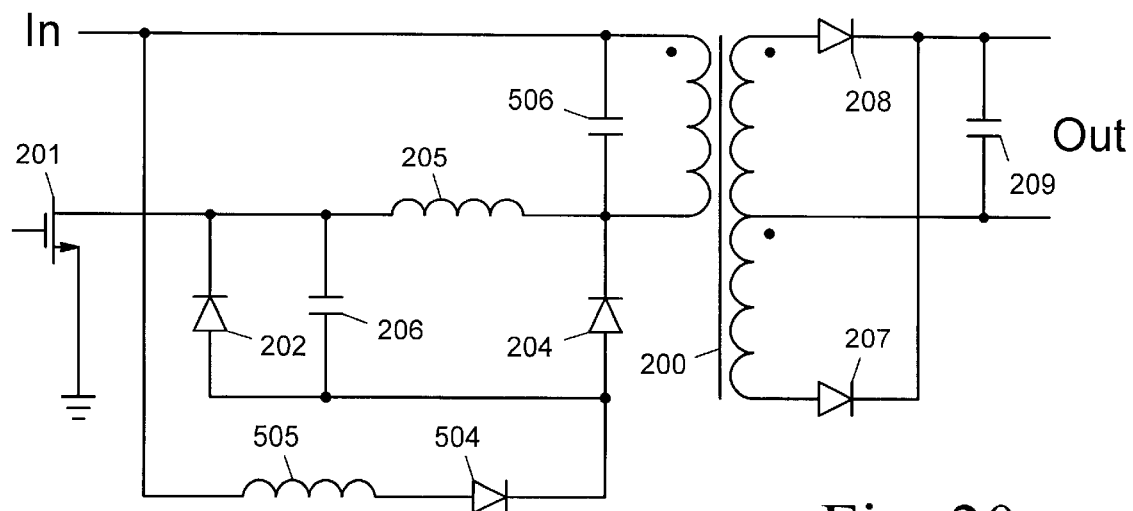
FIG. 20 is the preferred embodiment of a resonant quarter-bridge SPS.

FIG. 20 is the preferred embodiment of a resonant quarter-bridge SPS. The SPS comprises the same blocks as the FIG. 19 SPS. However, a switching means 201 selectively applies the first current to the third inductive means 200 and selectively applies a sum of the input and intermediate voltages to the second inductive means 505. A third capacitive means 506 stores the primary voltage. A third rectifying means 202 limits the intermediate voltage. Specifically, the components 200, 201, 204 through 209, 504 and 506 are connected as the components 190, 191, 194 through 199, 494 and 496 of the FIG. 19 respectively. One end of the inductor 505 is tied to the anode of the diode 504, similar to the inductor 495 of FIG. 19. However, the input voltage is applied to the other end. The capacitor 506 is essential for the operation of the SPS. The cathode of the optional diode 202 is connected to the drain of the switch 201, the inductor 205 and the capacitor 206. The anode of the diode 202 is connected to the anode of the diode 204, the cathode of the diode 504 and the capacitor 206.

The SPS can be compared to the quarter-bridge SPSs of FIG. 18, 19, the half-bridge converters of FIG. 8, 10 and the full-bridge converters of FIGS. 9, 11. The half- and full-bridge converters of FIGS. 8 through 11 become SPSs if they are supplied from a conventional DC voltage source rather than the X-type front-end. The push-pull operation is accomplished by producing the bi-directional primary current for driving the respective forward transformer. However, the input current is also bi-directional, i.e. some energy is fed back to the input source. This is caused by the leakage inductance in the converters of FIGS. 8, 9 and by the respective input inductor in the embodiments of FIGS. 10, 11, 18, 19. By contrast, the input current of the instant SPS is unidirectional. The switch 201 conducts the input current and is the only grounded component. Therefore, the input current collapses to zero when the switch 201 turns off.

The switch 201 turns on to enforce energy transfer through the diode 208. The switch 201 conducts a sum of both inductor currents. Therefore, the switch 201 turns on at zero current if both inductor currents are zero. The inductor 205 and the capacitor 206 are effectively grounded. The input voltage reduced by the primary voltage is applied across the inductor 205. Moreover, the sum of the input voltage and the voltage stored in the capacitor 206 is applied across the inductor 505. The diode 204 is cut off, wherein the increasing current of the inductor 205 is applied to the capacitor 506 and the primary winding. When the diode 208 conducts the secondary current, the primary voltage is limited to a first reflected voltage. Furthermore, the increasing current of the inductor 505 flows through the diode 504 and discharges the capacitor 206. The diode 202 is used if it is advantageous to completely discharge the capacitor 206. The voltage across the inductor 505 is then reduced to the input voltage, wherein the diode 202 conducts the current of that inductor.

The switch 201 turns off when the primary current reaches a desired level. The diode 204 conducts a sum of both inductor currents. Therefore, the capacitor voltage is applied across the inductor 205. The current thereof charges the capacitor 206. Conversely, primary voltage is applied across the inductor 505. The diodes 204 and 504 apply the current of that inductor 505 to the primary winding. This is consistent with the forward operation of the FIG. 13 SPS. The decreasing current of the inductor 505 is applied to the capacitor 506 and the primary winding. When the diode 207 conducts the secondary current, the primary voltage is reversed and limited to a second reflected voltage. In the discontinuous mode, the current of the inductor 505 drops to zero before zero crossing of the primary voltage. If the SPS is intended to be idle for extended time, a small inductor can be added in series with the capacitor 209 to practically eliminate parasitic oscillations.

Figure 21:
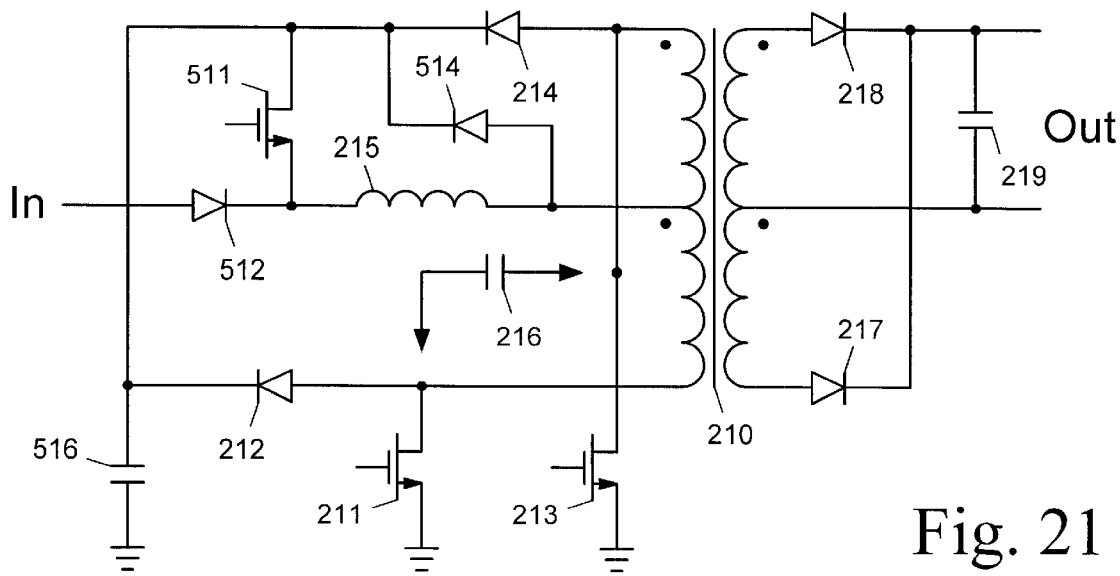
FIG. 21 is an embodiment of a push-pull SPS allowing the resonant operation.

FIG. 21 is an embodiment of a push-pull SPS allowing the resonant operation The SPS converts an input voltage into a DC output voltage. A first inductive means 215 attains a current. A second inductive means 210 provides a primary voltage in response to the current. A first capacitive means 516 stores the holdup voltage. A first switching means 211, 213 selectively applies the holdup voltage to the first inductive means. A second switching means 511 selectively applies the current to the second inductive means. A first rectifying means 512 applies the input voltage to the first inductive means. A second rectifying means 212, 214 applies the holdup voltage to the second inductive means. A third rectifying means 217, 218 limits the primary voltage and provides the DC output voltage. A second capacitive means 219 stores the DC output voltage. In the instant SPS, the second inductive means 210 includes a fourth inductive means for providing a secondary voltage in response to the primary voltage. Therefore, the third rectifying means 217, 218 limits also the secondary voltage.

The input voltage derives from the diode bridge 11 of FIG. 1 and, preferably, a capacitor connected thereto. If that capacitor is omitted, the diode 512 coupled in series with the input is superfluous. The topology of the SPS is based on the block diagram of FIG. 1. The front-end 12 and the converter 13 of FIG. 1 implement the X-type front-end of FIG. 3 and the push-pull converter of FIG. 12 respectively. However, the output inductor 125 of FIG. 12 is superfluous. The components 512 and 511, 215, 516 correspond to the components 11 of FIG. 1 and 31, 35, 36 of FIG. 3 respectively. The components 210 through 214 and 217 through 219 correspond to the components 120 through 124 and 127 through 129 of FIG. 12 respectively. The current of the inductor 215 is unidirectional. The capacitor 216 is added to accomplish the resonant operation. This capacitor is optional as marked in the drawing. The optional diode 514 is added to clamp voltage spikes at the primary center tap to the holdup voltage. The latter voltage is greater than a peak of the input voltage.

Specifically, the input voltage is applied to the anode of the diode 512. One end of the inductor 215 is tied to the source of the switch 511 and the cathode of the diode 512. The other end is tied to the anode of the diode 514 and a primary center tap of the transformer 210. One end of the primary winding is connected to the drain of the switch 211, the anode of the diode 212 and the capacitor 216. The other end is tied to the drain of the switch 213, the anode of the diode 214 and the capacitor 216. The drain of the switch 511 is connected to the cathodes of the diodes 212, 214, 514 and the capacitor 516. The sources of the switches 211, 213 and the capacitor 516 are grounded. The holdup voltage stored in the capacitor 516 may be also considered another input voltage. Accordingly, the first capacitive means may comprise another capacitor storing the input voltage. The second rectifying means applies then the respective input voltage to the transformer 210. The components 217 through 219 are connected as the components 127 through 129 of the FIG. 12 embodiment respectively.

The SPS operates in two switching phases. In the forward phase, the transformer 210 delivers energy to the capacitor 219. The switch 211 or 213 is turned on. The switch 511 turns on if the input voltage is insufficient, the input current is excessive or the holdup voltage is above a predetermined level. Preferably, the switch 511 and the switch 211 or 213 turn on simultaneously. The switch 511 applies the inductor current to the capacitor 516. Conversely, the diode 512 applies that current to the input if the switch 511 is turned off. The forward phase commences when the voltage appearing at the primary center tap reaches the reflected voltage. This occurs when the capacitor 216 is recharged and the respective diode 217 or 218 starts to conduct. The voltage across the primary winding is twice the reflected voltage. However, the former voltage is smaller than the holdup voltage, wherein the diodes 212 and 214 are cut off. The forward phase ends when the respective switch 211 or 213 turns off. The switch 511 remains turned off or turns off simultaneously. The switches 211 and 213 are switched alternately, wherein the transition phase follows each forward phase.

At the beginning of the transition phase, all switches 211, 213 and 511 are turned off. The diode 512 applies the inductor current to the input. The diode 212 or 214 applies the inductor current to the capacitor 516 after the switch 213 or 211 turns off respectively. The primary voltage decays to zero as the inductor current discharges the capacitor 216. Subsequently, both diodes 212 and 214 share the inductor current, wherein the primary voltage is zero. The voltage across the inductor 215 is approximately equal to a difference between the holdup voltage and the input voltage. Moreover, no parasitic oscillations occur as the primary winding is effectively shorted. This balance remains until the switch 211 or 213 turns on, or the inductor current drops to the level of the magnetizing current of the transformer 210. In the latter case, the diode 212 or 214 conducts the magnetizing current that is equal to the inductor current. The voltage at the primary center tap drops because the inductor 215 and the magnetizing inductance act like a voltage divider. Furthermore, the inductor current can be upheld if the switch 511 turns on. An alternative switching scheme such as PWM can be used without an output inductor.

Figure 22:
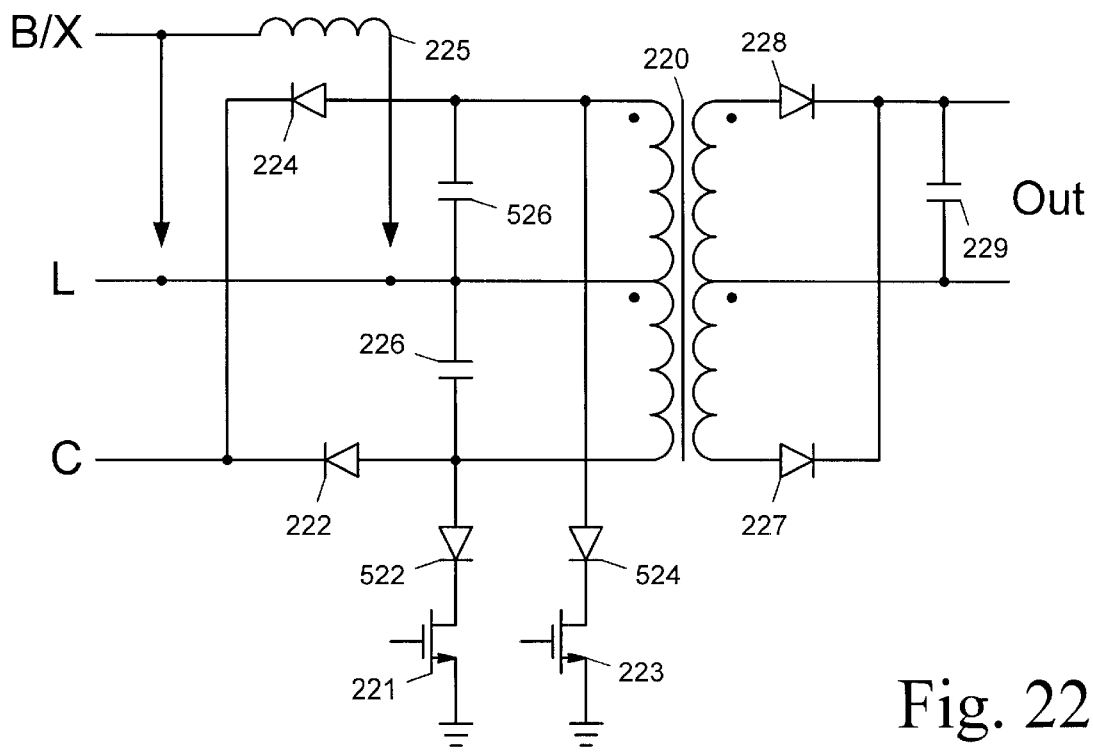
FIG. 22 is an embodiment of a resonant push-pull converter implementing power factor correction.

FIG. 22 is an embodiment of a resonant push-pull converter implementing power factor correction. The converter is based on the push-pull converter of FIG. 12. The components 220 through 224 and 227 through 229 correspond to the components 120 through 124 and 127 through 129 of FIG. 12 respectively. Two diodes and two capacitors are added. Furthermore, the inductor 225 operates on the primary side of the transformer 220 with the B- or X-type front-end. The B-type front-end with the switch 221 and X-type front-end with the switch 321 are unsuitable due to possible continuous current of that inductor. The X-type front-end with the switch 31 is preferred. If the L-type front-end is used, the input voltage is applied to a primary center tap of the transformer 220. Otherwise, the input voltage is applied through the inductor 225 to the tap. This is marked in the drawing. A peak voltage appearing across the primary winding is smaller than the holdup voltage at the output terminal C.

Specifically, the terminal L is connected to the primary center tap. Alternatively, the inductor 225 is tied between the terminal B/X and the tap. The drains of the switches 221 and 223 are connected to the cathodes of the diodes 522 and 524 respectively. The sources of the switches 221 and 223 are grounded. One end of the primary winding is tied to the anodes of the diodes 222, 522 and the capacitor 226. The other end is tied to the anodes of the diodes 224, 524 and the capacitor 526. The capacitors 226 and 526 are further connected to the primary center tap. The cathodes of the diodes 222 and 224 are connected to the output terminal C. The components 227 through 229 are connected as the components 127 through 129 of the FIG. 12 embodiment respectively. An output inductor is unnecessary.

The SPS operates in two switching phases. In the forward phase, the transformer 220 delivers energy to the capacitor 229. The switch 221 or 223 conducts the input current. The diode 227 or 228 conducts the secondary current when the capacitors 226 and 526 are recharged. The voltage appearing at the primary center tap is approximately equal to the reflected voltage. The voltage across the primary winding is twice the reflected voltage. However, the former voltage is smaller than the holdup voltage applied to the terminal C, wherein the diodes 222 and 224 are cut off. In the following transition phase, one switch or both switches 221 and 223 change states. No energy is delivered to the capacitor 229, whereas the input current can be increased, decreased or upheld.

With one switch closed, the capacitors 226 and 526 are each charged to the reflected voltage. The sum of the capacitor voltages is applied across the diode in series with that switch if the complementary switch turns on. For example, the switch 223 can turn on while the switch 221 is conductive. The sum of the capacitor voltages appears across the diode 522 that protects the switch 221. Therefore, the new forward phase starts after the switch 221 turns off and the capacitors 226 and 526 each are charged up again to the reflected voltage. However, polarities of the capacitor voltages are reversed and so is polarity of the voltage across the primary winding. By contrast, the capacitors 226 and 526 discharge to zero if the switch 221 remains closed. The voltage across the primary winding is near zero. No energy is delivered to the capacitor 229, whereas the input current continues to increase. Similarly, the capacitors 226 and 526 discharge to zero if both switches 221 and 223 are turned off. No energy is transferred as the voltage across the primary winding is near zero. However, the input current decreases or remains unchanged. This balance remains until the switch 221 or 223 turns on, or the respective inductor current drops to the level of the magnetizing current of the transformer 220.

The diodes 522 and 524 simplify the switching. Furthermore, the length of the transition phase is minimal, which results in a higher switching frequency. One switch can turn on to take over the input current that the complementary switch conducts. The capacitors 226 and 526 each store the primary voltage that peaks at the reflected voltage. Therefore, one of the diodes 522 or 524 is cut off to protect the respective switch. However, these diodes can be omitted if simplicity is the primary objective. The SPS is also more efficient if the input voltage level is relatively low. The switches 221, 223 and the diodes 522, 524 may conduct simultaneously only if the primary voltage is near zero. Moreover, an extended dead time is necessary to discharge the capacitors 226 and 526. Subsequently, either switch can turn on or both switches can turn on simultaneously.

The capacitors 226 and 526 are used to accomplish the resonant operation. Each capacitor is connected in parallel with the respective half of the primary winding. A single primary capacitor, such as 216 of FIG. 21, can be substituted for the capacitors 226 and 526. However, the capacitors 226 and 526 more effectively minimize impact of intra-winding capacitances appearing across the halves of the primary winding. Furthermore, a voltage spike emerging at the primary center tap is integrated. No parasitic oscillations occur in the transition phase if the respective inductor current prevails over the magnetizing current. Consequently, the primary voltage is near zero if both switches are open or closed. The inductor current is upheld if the switch of the B- or X-type front end turns on. An alternative switching scheme such as PWM can be implemented without an output inductor.

Figure 23:
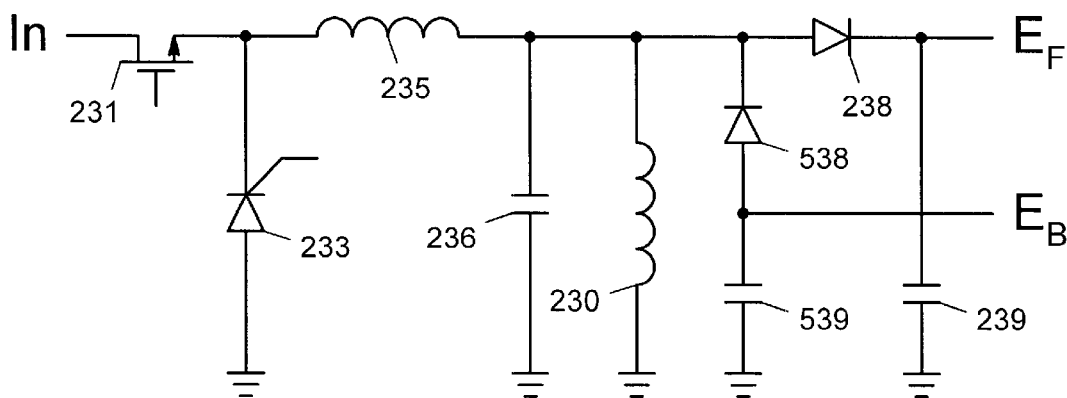
FIG. 23 is the preferred embodiment of two-switch transformer-less resonant SPS.

FIG. 23 is the preferred embodiment of two-switch transformer-less resonant SPS. A transformer is used in all previous SPSs and converters. FIG. 1 depicts a block diagram of an SPS that includes the converter 13. However, line isolation and power transformation are often unnecessary. For example, a central SPS already provides just for that in a distributed power system. The instant SPS is the transformer-less version of the resonant forward/flyback SPS of FIG. 13. The components 231, 233, 235, 236, 238 and 239 correspond to the components 131, 133, 135, 136, 138 and 139 of FIG. 13 respectively. The inductor 230 corresponds to the transformer 130 of FIG. 13. It may be considered a transformer with indistinguishable primary and secondary windings. Furthermore, the equations that define the FIG. 13 SPS are applicable to the instant SPS under specific conditions. In order to emphasize that, output voltages of the SPS are labeled $E_F$ and $E_B$ that refer to the reflected forward and flyback voltages of the FIG. 13 SPS respectively.

Generally, the SPS converts an input voltage or voltages into a DC output voltage or voltages. A first inductive means attains a current. A switching means selectively applies the input voltage or voltages to the first inductive means. A second inductive means provides a primary voltage in response to the current. A first capacitive means stores the primary voltage. A rectifying means rectifies the primary voltage. A second capacitive means is coupled to the rectifying means for providing the DC output voltage or voltages. The switching means may include a second rectifying means for applying at least one input voltage to the first inductive means. Otherwise, the SPS includes a second switching means for selectively applying the primary voltage to the first inductive means.

Specifically, the supply voltage V is applied to the drain of the switch 231. One end of the inductor 235 is tied to the source of the switch 231 and the cathode of the switch 233, a thyristor. A MOSFET in series with a diode is intended to operate as the switch 233. The other end of the inductor 235 is tied to the anode of the diode 238, the cathode of the diode 538, the inductor 230 and the capacitor 236. The cathode of the diode 238 is connected to the capacitor 239 that provides the positive output voltage $E_F$. The anode of the diode 538 is tied to the capacitor 539 that provides the negative output voltage $E_B$. The anode of the switch 233, the inductor 230 and the capacitors 236, 239, 539 are grounded.

Figure 26:
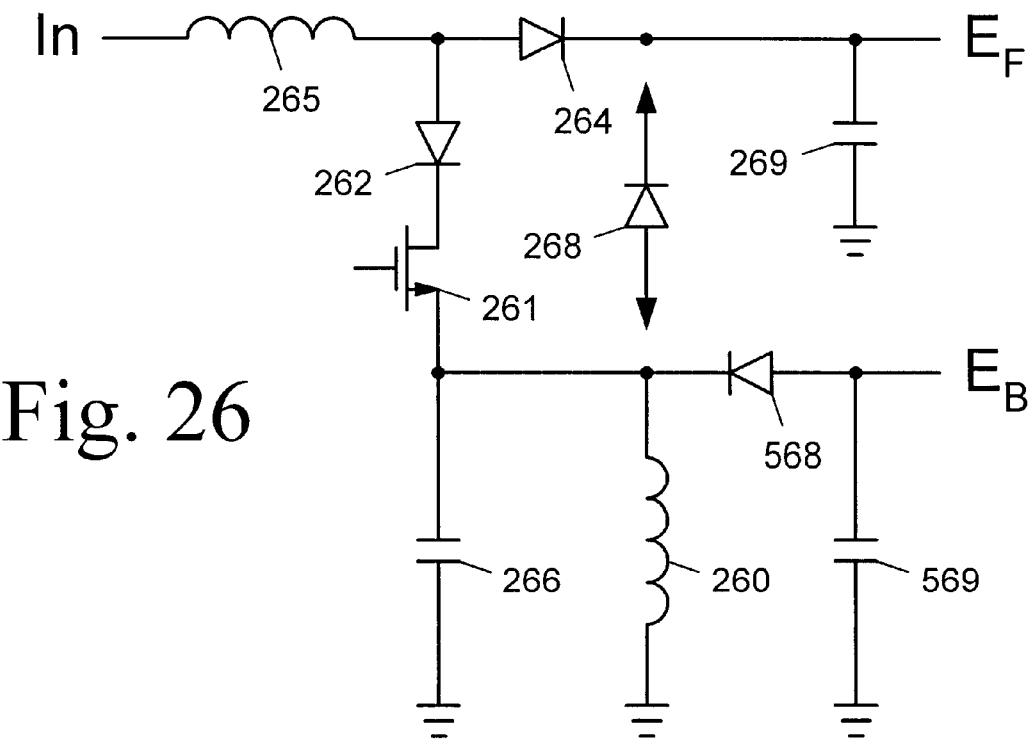
FIG. 26 is an embodiment of one-switch transformer-less resonant SPS.

The switch 231 selectively applies V to the inductor 235. The inductor 235 attains a unidirectional current. The inductor 230 provides a primary voltage in response to that current. The capacitor 236 stores the primary voltage. The switch 233 selectively applies the primary voltage across the inductor 235. The SPS can regulate $E_F$, $E_B$ or simultaneously regulate both $E_F$ and $E_B$. $E_F$ is regulated by turning off the switch 231 as to set a peak current of the inductor 235. $E_B$ is regulated by turning on the switch 231 as to determine the length of the conduction phase of the diode 538. $E_F$ can be lower or higher than V. In the latter case, a diode connected in series with the switch 231 is required. This feature is depicted in FIG. 26. $E_B$ can be lower or higher than negative value of V.

The switches 231 and 233 are activated simultaneously. However, the switch 233 remains open. V is applied to the cathode of the switch 233 that is thus reverse polarized. When the switch 231 turns off, the switch 233 takes over the current of the inductor 235. The inductors 230, 235 and the capacitor 236 are effectively coupled in parallel. The switch 233 turns off automatically when the current of the inductor 235 drops below a thyristor holding current. The latter current is substantially equal to zero. The switch 231 turns on at zero current if the SPS operates in the discontinuous mode. By contrast, the switch 233 turns off only when the current of the inductor 235 drops to zero during the respective transition phase. Therefore, the switch 233 remains closed if the SPS operates in the continuous mode.

The SPS has numerous advantages over comparable conventional devices. These devices comprise a single switch and one or two inductors. The instant SPS comprises the switches 231 and 233. However, these switches can be integrated into a single module having four pins, including a control pin. In order to avoid any conflict of terms, the conventional devices are referred to as SPSs rather than converters. The positive supply voltage V is assumed. The buck and boost SPSs provide output voltages that are smaller or larger than V respectively. Therefore, both SPSs are incapable of providing the output voltage in an extended range. The buck-boost and Cuk SPSs produce negative output voltages solely. Moreover, a switch in the Cuk SPS has to sustain large current spikes. Only the SEPIC SPS can produce an output voltage that is lower or higher than V. However, the Cuk and SEPIC SPSs each require a series-coupled capacitor. Each conventional SPS is capable of regulating merely a single output voltage having characteristic polarity.

By contrast, the instant SPS can regulate $E_F$ or $E_B$, or simultaneously regulate both $E_F$ and $E_B$. Moreover, $E_F$ can be lower or higher than V. In the latter case or if $E_B$ is the single output voltage, $E_B$ can be lower or higher than negative value of V. Furthermore, a diode connected in series with the switch 231 is required. This diode also protects the SPS against incorrectly applied input voltage. The diodes 238 and 538 are switched smoothly as their voltages and currents vary at reduced rates. This minimizes output voltage ripple and noise. Discontinuous mode of operation is preferred so that the switch 231 turns on at zero current. The switch 233 inherently turns on at zero voltage and zero current, and turns off at zero current.

The most common application may be the SPS converting the single input voltage V into the single output voltage $E_F$, both positive. For example, a battery can supply V that is initially higher than $E_F$ and becomes lower as the battery voltage deteriorates. Accordingly, the SPS is capable of providing $E_F$ that can be lower or higher than the battery voltage. In the latter case, the battery voltage is applied to the switch 231 through a diode. Energy is transferred to the capacitor 239 only during the conduction phase of the diode 238. A transition phase separates consecutive conduction phases. Furthermore, the SPS can operate in the discontinuous or continuous mode. In the former case, the current of the inductor 235 drops to zero. If $E_F$ is smaller than V, conduction phases of the switch 231 and the diode 238 overlap, as in the previous examples. Therefore, an analysis of the SPS operating in the discontinuous mode and boosting the battery voltage will be conducted. In order to take advantage of the previous examples, comparable switching conditions are assumed. Equations governing the operation of the SPS derive from the equations pertaining to the forward/flyback SPS of FIG. 13.

The SPS delivers the highest possible $E_F$ when no load is used. Assuming further that forward voltages of conducting semiconductors are negligible, $E_F$ is equal to a peak voltage across the inductor 230. The equations [1] describe the operation of the SPS at the beginning of the switching cycle starting at transformer reset. This corresponds the inductor 230 that is discharged. The equations [9] define the conditions of transformer reset. This, again, is equivalent to the discharged inductor 230. Moreover, the primary voltage at which the switching cycle starts is equal to $E_B$.

$$E_F = \frac{2\alpha}{1+\alpha} V + E_B$$

$$E_B = \pm E_F \sqrt{1-\alpha^2}$$

$$\alpha = \frac{L_M}{L_D} < 1$$

In this example, $L_D$ and $L_M$ are the values of the inductors 235 and 230 respectively. The above equations yield the relation between $E_F$ and V:

$$E_F = \frac{1+\sqrt{1-\alpha^2}}{\alpha(1+\alpha)} 2V$$

For example, $E_F$ is about five times larger than V if $L_M$ is one half of $L_D$. $E_F$ is about dozen times larger than V if $L_M$ is one quarter of $L_D$.

Figure 24:
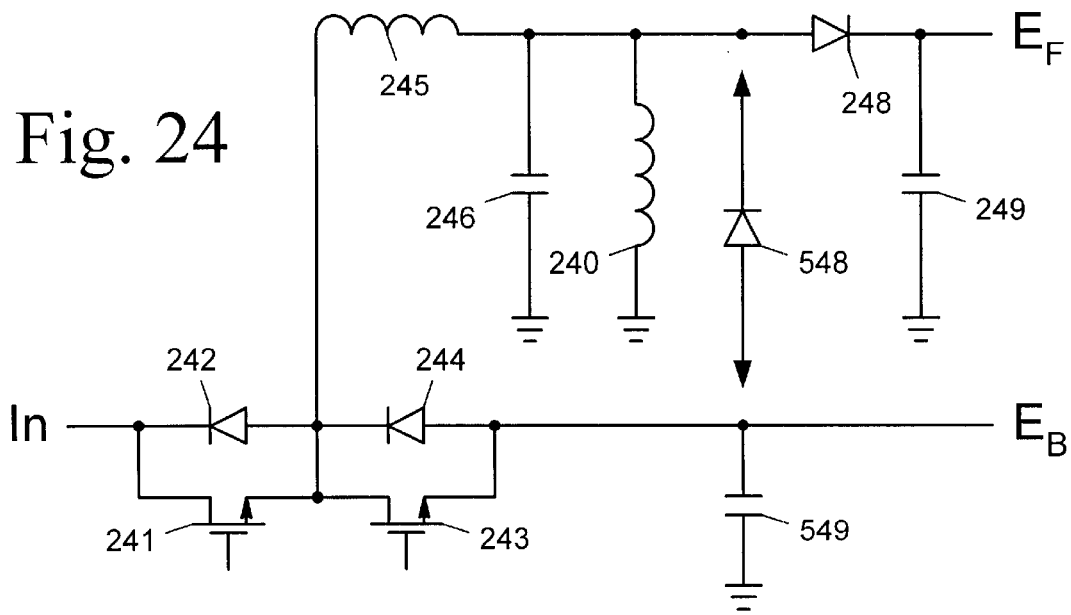
FIG. 24 is another embodiment of two-switch transformer-less resonant SPS.

FIG. 24 is another embodiment of two-switch transformer-less resonant SPS. Similar to the FIG. 23 SPS, one or both output voltages $E_F$ and $E_B$ are regulated. The switch 243 represents a switching means for selectively applying $E_B$ to the inductor 245. The diode 548 is optional as marked in the drawing. Specifically, the input voltage is applied to the drain of the switch 241 and the cathode of the diode 242. One end of the inductor 245 is tied to the source of the switch 241, the drain of the switch 243, the anode of the diode 242 and the cathode of the diode 244. The other end is tied to the anode of the diode 248, the cathode of the diode 548, the inductor 240 and the capacitor 246. The cathode of the diode 248 is connected to the capacitor 249 that provides the positive output voltage $E_F$. The source of the switch 243 and the anodes of the diodes 244, 548 are connected to the capacitor 549 that provides the negative output voltage $E_B$. The inductor 240 and the capacitors 246, 249, 549 are grounded.

The switch 241 or 243 turns on to increase the current of the inductor 245 in the respective direction. Preferably, the SPS operates in the discontinuous mode as to carry out zero current switching. Energy derives from the input source if the switch 241 is closed. The current of the inductor 245 charges the capacitor 249 while the switch 241 conducts and/or thereafter. This current discharges the capacitor 549 if the switch 243 is closed. The switch 241 or 243 turns off when the current reaches a desired level. The respective diode 244 or 242 takes over the current. In the former case, the current charges the capacitor 549. In the latter case, energy is fed back to the input source. Furthermore, power loss of the conducting diode 242 or 244 can be eliminated if the switch 241 or 243 turns on respectively. The diodes 242, 248 and 244 limit voltages applied to the inductor 245 to the input voltage, $E_F$ and $E_B$ respectively. The load at $E_B$ can be larger if the diode 548 is used. Conversely, if that load and the diode 548 are unused, the capacitor 549 acts like another input source.

Figure 25:
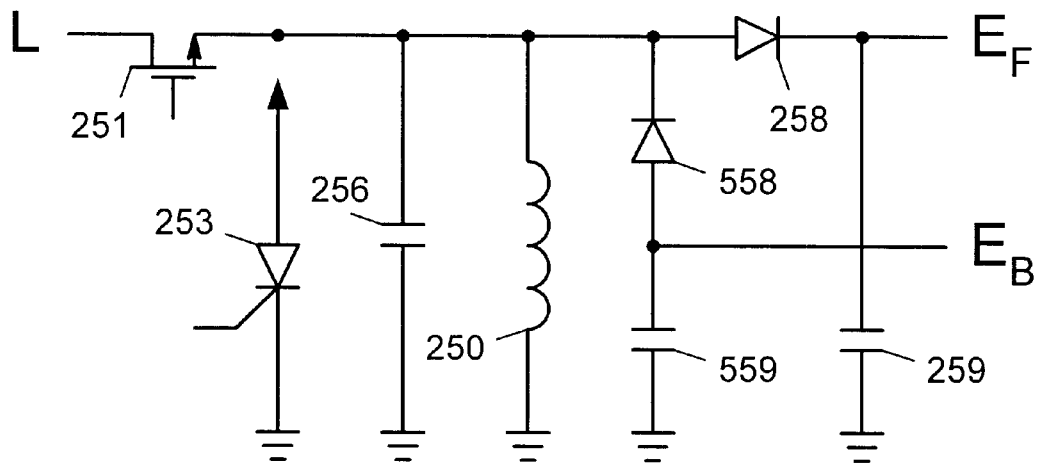
FIG. 25 is the preferred embodiment of one- or two-switch transformer-less resonant SPS implementing power factor correction.

FIG. 25 is the preferred embodiment of one- or two-switch transformer-less resonant SPS implementing power factor correction. The instant converter is the transformer-less version of the resonant converter of FIG. 16. The switch 253, a thyristor, is optional as marked in the drawing. The converter is supplied from the L-type front-end. The input voltage at the terminal L is applied to the drain of the switch 251. The source of the switch 251 is connected to the anode of the switch 253, the anode of the diode 258, the cathode of the diode 558, the inductor 250 and the capacitor 256. A MOSFET in series with a diode is intended to operate as the switch 253. The cathode of the diode 258 is connected to the capacitor 259 that provides the positive output voltage $E_F$. The anode of the diode 558 is tied to the capacitor 559 that provides the negative output voltage $E_B$. The cathode of the switch 253, the inductor 250 and the capacitors 256, 259, 559 are grounded.

The switching cycle begins when the switch 251 turns on. An equivalent inductor producing the input current is in series with the resonant network 250, 256. When the switch 251 turns off, that inductor is separated from the resonant network. An output diode of the front-end applies its inductor current to the holdup capacitor. The SPS can regulate $E_F$, $E_B$ or simultaneously regulate both $E_F$ and $E_B$. $E_F$ is regulated by turning off the switch 251 as to set a peak of the input current. $E_B$ is regulated by turning on the switch 251 as to determine the length of the conduction phase of the diode 558. $E_F$ can be lower or higher than the holdup voltage. In the latter case or if $E_B$ is the single output voltage, $E_B$ can be lower or higher than negative value of the holdup voltage. A diode connected in series with the switch 251 is required if $E_F$ is higher than the holdup voltage.

The optional switch 253 is activated in order to increase the input current while preventing energy transfer to the capacitors 259, 559. The switch 253 is activated when the voltage thereacross is reversed. Therefore, the switch 253 turns on at zero voltage and zero current. Moreover, the switch 251 turns on when a voltage across the resonant network decreases in order to minimize energy stored therein. The resonant network continues to oscillate, whereas amplitude of the oscillations is limited to a forward voltage of the switch 253. When the switch 251 is turned on, both switches 251 and 253 conduct the input current. The input current increases, whereas the diodes 258 and 558 are cut off. The switch 251 turns off to interrupt the input current. A current conducted by the switch 253 collapses below a thyristor holding current. Therefore, the switch 253 turns off automatically.

The switch 253 is superfluous if saturation of the inductor 250 is exploitable. The switch 251 is closed so that the input current exceeds a peak level produced during normal operation. An equivalent output inductor of the front-end and the inductor 250 constitute a voltage divider. A voltage across the inductor 250 is nearly constant. This results in a current build-up in the inductor 250 that eventually saturates. If the diode 258 conducts, a current spike is applied to the capacitor 259. Main advantages of this method are utter simplicity and reduced cost of the converter. The operation with the saturated inductor 250 may be also more efficient than with the switch 253 having an increased forward voltage.

FIG. 26 is an embodiment of one-switch transformer-less resonant SPS. Line isolation and power transformation are often unnecessary. For example, multiple point-of-use SPSs are configured in distributed power architecture. The components 260, 261, 266, 268, 269, 568 and 569 are connected as the components 250, 251, 256, 258, 259, 558 and 559 of the FIG. 25 embodiment respectively. However, the instant SPS is supplied from a DC source. The diodes 262, 264 and the inductor 265 are added. Conversely, the diode 268 is optional as marked in the drawing. The load at $E_F$ can be larger if the diode 268 is used. Specifically, the input voltage is applied to one end of the inductor 265. The other end is tied to the anodes of the diodes 262 and 264. The drain of the switch 261 is connected to the cathode of the diode 262. The cathodes of the diodes 264 and 268 are connected to the capacitor 269. The capacitors 268 and 568 provide the positive output voltage $E_F$ and the negative output voltage $E_B$ respectively.

The SPS can regulate $E_F$ or $E_B$, or simultaneously regulate both $E_F$ and $E_B$. $E_F$ is higher than the input voltage. Therefore, the diode 262 is necessary to protect the switch 261 against an excessive reverse voltage. $E_B$ can be lower or higher than negative value of the input voltage. $E_F$ is regulated by turning off the switch 261 as to set a peak current of the inductor 265. $E_B$ is regulated by turning on the switch 261 as to determine the length of the conduction phase of the diode 568. In particular, the switch 261 can prevent conduction of the diode 568 altogether. The switch 261 turns on to apply the current of the inductor 265 to the resonant network 260, 266. However, the switch 261 turns on at zero voltage and zero current if the diode 268 conducts. When the switch 261 turns off, the diode 264 takes over the current of the inductor 265. The diodes 268 and 568 limit a voltage across the resonant network to $E_F$ and $E_B$ respectively.

Figure 27:
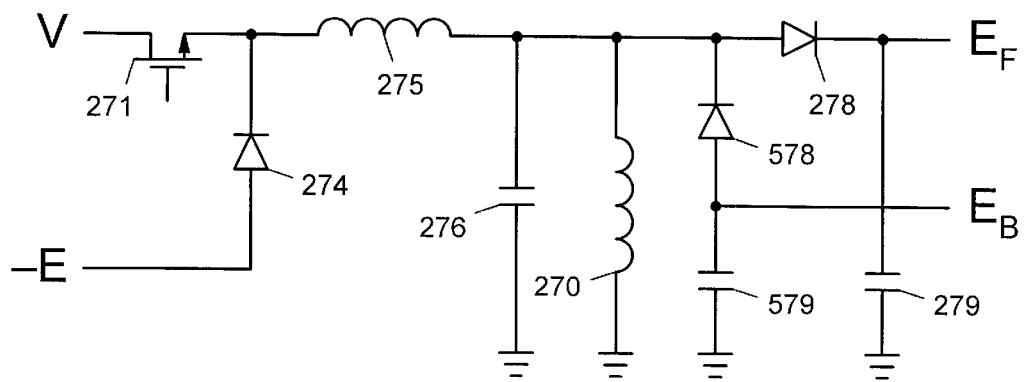
FIG. 27 is the preferred embodiment of one-switch transformer-less resonant SPS.

FIG. 27 is the preferred embodiment of one-switch transformer-less resonant SPS. The instant SPS is a simplified version of the resonant forward/flyback SPS of FIG. 23. The components 270, 271, 275, 276, 278, 279, 578 and 579 are connected as the components 230, 231, 235, 236, 238, 239, 538 and 539 of the FIG. 23 embodiment respectively. Moreover, the diode 274 is substituted for the switch 233. A positive supply voltage V is applied to the drain of the switch 271. A negative supply voltage –E is applied to the anode of the diode 274. Hence the diode 274 applies –E to the inductor 275. The cathode of the diode 274 is connected to the switch 271 and the inductor 275. The capacitors 279 and 579 provide the positive output voltage $E_F$ and the negative output voltage $E_B$ respectively.

The switch 271 turns on to apply V to the inductor 275. The diode 274 is reverse polarized. The SPS can regulate $E_F$, $E_B$ or simultaneously regulate both $E_F$ and $E_B$. $E_F$ is regulated by turning off the switch 271 as to set a peak current of the inductor 275. $E_B$ is regulated by turning on the switch 271 as to determine the length of the conduction phase of the diode 578. $E_F$ can be lower or higher than V. In the latter case or if $E_B$ is the single output voltage, $E_B$ can be lower or higher than negative value of V. A diode connected in series with the switch 271 is required if $E_F$ is higher than V. When the switch 271 turns off, the diode 274 feeds back energy stored in the inductor 275 to the input source.

Figure 28:
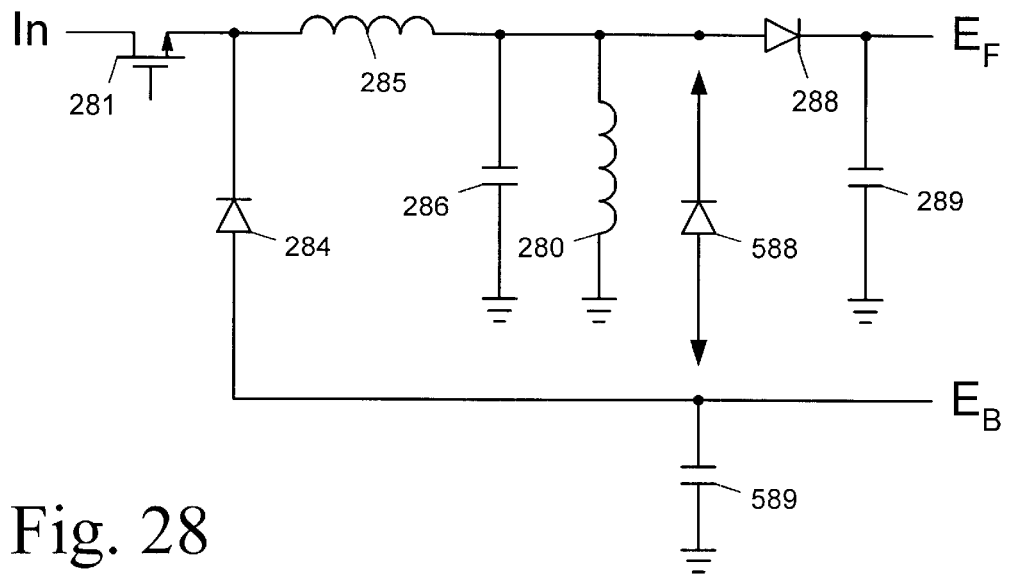
FIG. 28 is another embodiment of one-switch transformer-less resonant SPS.

FIG. 28 is another embodiment of one-switch transformer-less resonant SPS. The SPS is based on the FIG. 27 SPS, whereas a single supply voltage is required . The components 280, 281, 285, 286, 288, 289, 588 and 589 are connected as the components 270, 271, 275, 276, 278, 279, 578 and 579 of the FIG. 27 embodiment respectively. The diode 284 corresponds to the diode 274 of FIG. 27. The cathode of the diode 284 remains connected to the switch 281 and the inductor 285. However, the anode of the diode 284 is connected to the capacitor 589. The diode 588 is optional as marked in the drawing. The diode 588 is used to increase the load at $E_B$. The diode 284 represents a rectifying means for applying $E_B$ to the inductor 285. Consequently, the diodes 288 and 284 limit voltages applied to the inductor 285 to $E_F$ and $E_B$ respectively. The capacitors 289 and 589 represent a capacitive means that provides a plurality of the DC output voltages. Accordingly, the output voltages $E_F$ and $E_B$ appear across the capacitors 289 and 589 respectively. A diode connected in series with the switch 281 is required if $E_F$ is higher than the input voltage.

The switch 281 turns on to increase the current of the inductor 285. The diode 284 is reverse biased. The switch 281 turns on at zero current if the SPS operates in the discontinuous mode. The inductor 285 is effectively coupled in series with the input source. The switch 281 turns off when the current of the inductor 285 reaches a desired level. This is also a peak value of that current and a peak drain current of the switch 191, within one switching cycle. The diode 284 takes over the current of the inductor 285 and applies it to the capacitor 589. The inductors 280, 285 and the capacitor 286 form a resonant network. When the current of the inductor 285 drops to zero, the diode 284 is cut off. The resonant network is reduced to the inductor 280 and the capacitor 286 as the inductor 285 is effectively disconnected. By contrast, the diode 284 continues to conduct if the SPS operates in the continuous mode. $E_F$ is regulated by turning on the switch 281 as to determine the length of the conduction phase of the diode 288. $E_B$ is regulated by turning off the switch 281 as to set a peak current of the inductor 285. In particular, the switch 281 can prevent conduction of the diode 288 altogether.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting an AC input voltage into at least one output voltage comprising:

a rectifying means for rectifying the input voltage;

a front-end means having a terminal coupled to the rectifying means for storing a holdup voltage and for selectively applying the holdup voltage to the terminal; and a converter means for converting a voltage appearing at the terminal into the output voltage.

2. Switching power supply of claim 1 wherein the front-end means includes a switching means for selectively applying the holdup voltage to the terminal.

3. Switching power supply of claim 1 wherein the front-end means includes a second rectifying means for limiting the voltage at the terminal substantially to the holdup voltage.

4. Switching power supply of claim 1 wherein the front-end means includes a capacitive means for storing the holdup voltage.

5. Switching power supply of claim 1 wherein the front-end means includes an inductive means coupled between the rectifying means and the terminal for attaining a current.

6. Switching power supply of claim 5 wherein the front-end means includes:

a second inductive means for attaining a second current;

a switching means for selectively applying the holdup voltage to the second inductive means; and a second rectifying means for applying the second current to the terminal.

7. Switching power supply of claim 5 wherein the front-end means includes:

a second inductive means for attaining a second current;

a switching means for selectively applying the holdup voltage to the second inductive means; and a second rectifying means for applying the second current to first said rectifying means.

8. Switching power supply of claim 1 wherein the front-end means includes a second rectifying means for minimizing a reverse voltage at the terminal.

9. Switching power supply of claim 1 wherein the converter means includes a switching means for selectively reducing the voltage at the terminal substantially to zero.

10. Switching power supply of claim 1 wherein the converter means includes an inductive means coupled to the terminal for attaining a current.

11. Switching power supply converting at least one input voltage into at least one DC output voltage comprising:

a first inductive means for attaining a current;

a switching means for selectively applying the input voltage to the first inductive means;

a second inductive means coupled to the first inductive means for providing a primary voltage in response to the current;

a first capacitive means coupled to the second inductive means for storing the primary voltage;

a rectifying means coupled to the second inductive means for rectifying the primary voltage; and a second capacitive means coupled to the rectifying means for providing the DC output voltage.

12. Switching power supply of claim 11 wherein the switching means includes a second rectifying means for applying the input voltage to the first inductive means.

13. Switching power supply of claim 11 wherein the second inductive means includes a third inductive means for providing a secondary voltage in response to the primary voltage, and further wherein the rectifying means rectifies the secondary voltage.

14. Switching power supply of claim 11 further including a second rectifying means for applying the primary voltage to the first inductive means.

15. Switching power supply of claim 11 further including a second switching means for selectively applying the primary voltage to the first inductive means.

16. Switching power supply of claim 11 further including a second rectifying means for applying the input voltage to the second inductive means.

17. Switching power supply of claim 11 further including a second rectifying means for applying at least one DC output voltage to the first inductive means.

18. Switching power supply of claim 17 further including a second switching means for selectively applying at least one DC output voltage to the first inductive means.

19. Switching power supply of claim 11 further including a second switching means coupled to the second inductive means for selectively reducing the primary voltage substantially to zero.

20. Switching power supply of claim 11 further including a third capacitive means for storing at least one input voltage.

21. Switching power supply of claim 11 further including a third capacitive means coupled in series with the first inductive means for storing an intermediate DC voltage.

22. Switching power supply of claim 11 further including a third inductive means coupled in series with the rectifying means for substantially depleting energy stored in the second inductive means.

23. Switching power supply of claim 11 further including a third inductive means coupled in series with the rectifying means for stabilizing the DC output voltage.

24. Switching power supply converting an input voltage into at least one DC output voltage comprising:

a first inductive means for attaining a first current;

a second inductive means for attaining a second current;

a third inductive means receiving the input voltage and coupled to the first inductive means for providing a primary voltage;

a first capacitive means coupled to the first inductive means for storing an intermediate voltage;

a switching means coupled to the first inductive means for selectively applying the first current to the third inductive means and coupled to the first capacitive means for selectively applying the intermediate voltage to the second inductive means;

a first rectifying means coupled to the first capacitive means for applying the intermediate voltage to the first inductive means and coupled to the second inductive means for applying the second current to the third inductive means;

a second rectifying means coupled to the third inductive means for limiting the primary voltage; and a second capacitive means coupled to the second rectifying means for storing the DC output voltage.

25. Switching power supply of claim 24 wherein the third inductive means includes a fourth inductive means for providing a secondary voltage in response to the primary voltage, and further wherein the second rectifying means limits the secondary voltage.

26. Switching power supply converting an input voltage into at least one DC output voltage comprising:

a first inductive means for attaining a current;

a second inductive means coupled to the first inductive means for providing a primary voltage in response to the current;

a first capacitive means for storing an intermediate DC voltage;

a first switching means coupled between the first capacitive means and the first inductive means for selectively applying the intermediate DC voltage thereto;

a second switching means coupled to the second inductive means for selectively applying the current thereto;

a first rectifying means coupled to the first inductive means for applying the input voltage thereto;

a second rectifying means coupled between the first capacitive means and the second inductive means for applying the intermediate DC voltage thereto;

a third rectifying means coupled to the second inductive means for limiting the primary voltage; and a second capacitive means coupled to the third rectifying means for storing the DC output voltage.

27. Switching power supply of claim 26 wherein the second inductive means includes a third inductive means for providing a secondary voltage in response to the primary voltage, and further wherein the third rectifying means limits the secondary voltage.

* * * * *